United States Patent
Gorney et al.

(10) Patent No.: US 8,882,004 B2
(45) Date of Patent: Nov. 11, 2014

(54) DRIP IRRIGATION APPARATUS

(75) Inventors: Moshe Gorney, Naan (IL); Eldad Dinor, Naan (IL); David Sol, Naan (IL); Tomer Cohen, Even Yehuda (IL); Izhak Gal, Naan (IL)

(73) Assignee: Naan-Dan Jain Irrigation (C.S.) Ltd., Naan (IL)

( * ) Notice: Subject to any disclaimer, the term of this patent is extended or adjusted under 35 U.S.C. 154(b) by 7 days.

(21) Appl. No.: 13/470,905

(22) Filed: May 14, 2012

(65) Prior Publication Data

US 2012/0256017 A1 Oct. 11, 2012

Related U.S. Application Data

(62) Division of application No. 12/084,350, filed as application No. PCT/IL2006/001265 on Nov. 1, 2006, now abandoned.

(60) Provisional application No. 60/732,611, filed on Nov. 1, 2005.

(51) Int. Cl.
*B05B 15/00* (2006.01)
*A01G 25/06* (2006.01)
*B05B 15/06* (2006.01)
*A01G 25/02* (2006.01)

(52) U.S. Cl.
CPC .................................. *A01G 25/023* (2013.01)
USPC ............ 239/542; 239/201; 239/569; 239/571

(58) Field of Classification Search
USPC ......... 239/542, 201, 196, 195, 276, 279, 569, 239/510, 571; 137/859; 47/79
See application file for complete search history.

(56) References Cited

U.S. PATENT DOCUMENTS

| | | | |
|---|---|---|---|
| 3,870,236 A | | 3/1975 | Sahagun-Barragan |
| 3,979,070 A | * | 9/1976 | Lemelshtrich ................ 239/542 |
| 3,998,391 A | * | 12/1976 | Lemelshtrich ................ 239/542 |
| 4,177,946 A | | 12/1979 | Sahagun-Barragan |
| 4,199,106 A | | 4/1980 | Kojimoto |
| 4,235,380 A | | 11/1980 | Delmar |
| 4,285,472 A | | 8/1981 | Okada et al. |

(Continued)

FOREIGN PATENT DOCUMENTS

| | | |
|---|---|---|
| EP | 0709020 | 5/1996 |
| ES | 251545 | 6/1981 |
| WO | WO 98/38847 | 9/1998 |

OTHER PUBLICATIONS

English Translation of an Office Action dated Mar. 25, 2013, which issued during the prosecution of Mexican Patent Application No. MX/A/2011/006553.

(Continued)

*Primary Examiner* — Justin Jonaitis
(74) *Attorney, Agent, or Firm* — Husch Blackwell LLP

(57) ABSTRACT

Drip irrigation apparatus including a main water flow channel having associated therewith along a length thereof a plurality of pressure-controlled drip irrigation emitter units and at least one secondary water flow channel extending generally parallel to the main water flow channel and receiving water from at least one of the plurality of pressure-controlled drip irrigation emitter units, the at least one secondary water flow channel having water outlets disposed along the length of the main water flow channel, intermediate the plurality of pressure-controlled drip irrigation emitter units.

37 Claims, 27 Drawing Sheets

(56) References Cited

U.S. PATENT DOCUMENTS

| | | |
|---|---|---|
| 4,430,020 A | 2/1984 | Robbins |
| 4,460,129 A | 7/1984 | Olson |
| 4,473,191 A | 9/1984 | Chapin |
| 4,534,515 A | 8/1985 | Chapin |
| 4,626,130 A | 12/1986 | Chapin |
| 4,687,143 A | 8/1987 | Gorney et al. |
| 4,763,842 A | 8/1988 | Dunn |
| 4,874,132 A | 10/1989 | Gilead |
| 5,106,021 A | 4/1992 | Gilead |
| 5,282,578 A * | 2/1994 | De Frank .................. 239/542 |
| 5,299,885 A | 4/1994 | Prassas et al. |
| 5,615,838 A | 4/1997 | Eckstein et al. |
| 5,673,852 A * | 10/1997 | Roberts ....................... 239/1 |
| 5,820,028 A | 10/1998 | Dinur |
| 6,027,048 A | 2/2000 | Mehoudar |
| 6,206,305 B1 | 3/2001 | Mehoudar |
| 6,250,571 B1 | 6/2001 | Cohen |
| 6,382,530 B1 | 5/2002 | Perkins |
| 6,568,607 B2 | 5/2003 | Boswell et al. |
| 6,968,759 B2 | 11/2005 | Becker et al. |
| 2003/0089803 A1 | 5/2003 | Huntley |

OTHER PUBLICATIONS

International Search Report for related patent application No. PCT/IL 06/01265, Jul. 18, 2009.

An Office Action dated Aug. 10, 2010, which issued during the prosecution of Applicant's Israel patent application No. 191149.

An Office Action dated Aug. 17, 2010, which issued during the prosecution of Applicant's Israel patent application No. 200631 0098.

* cited by examiner

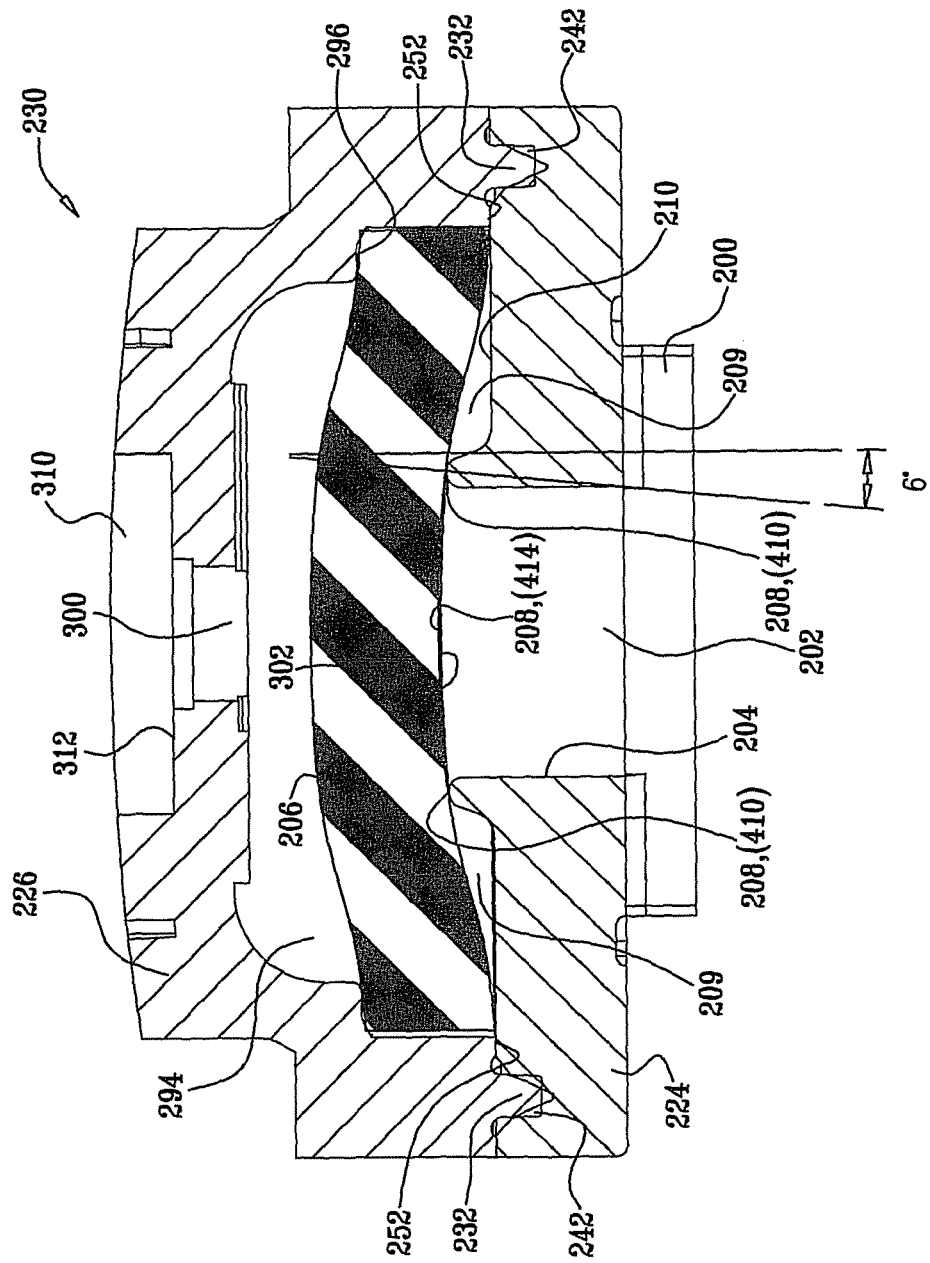

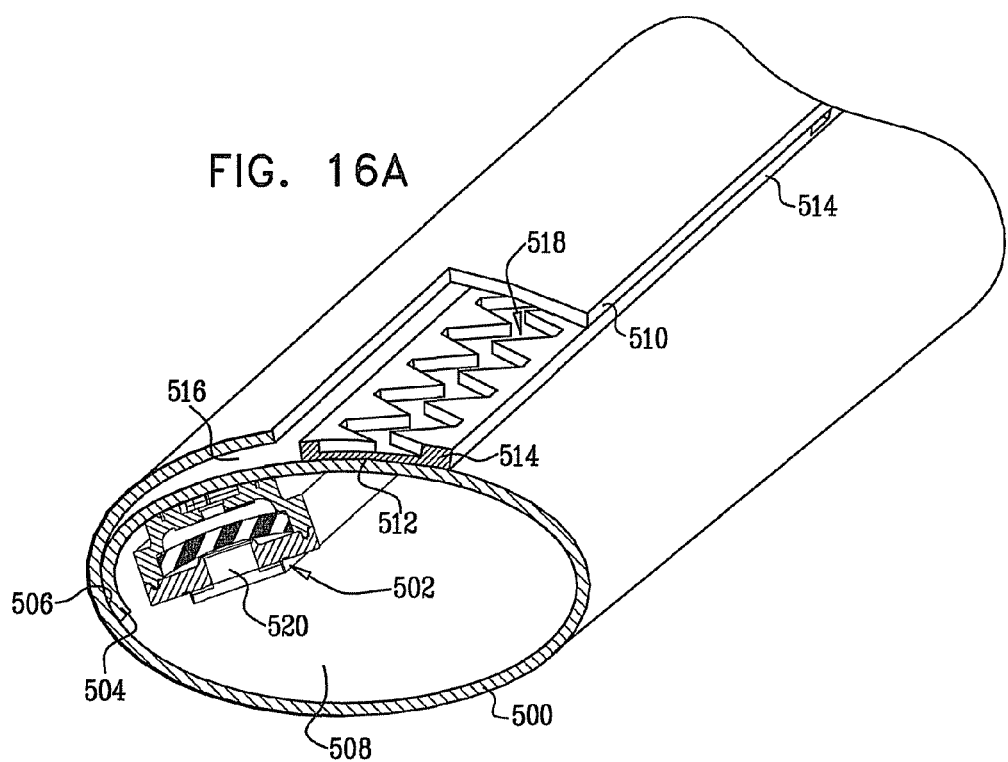
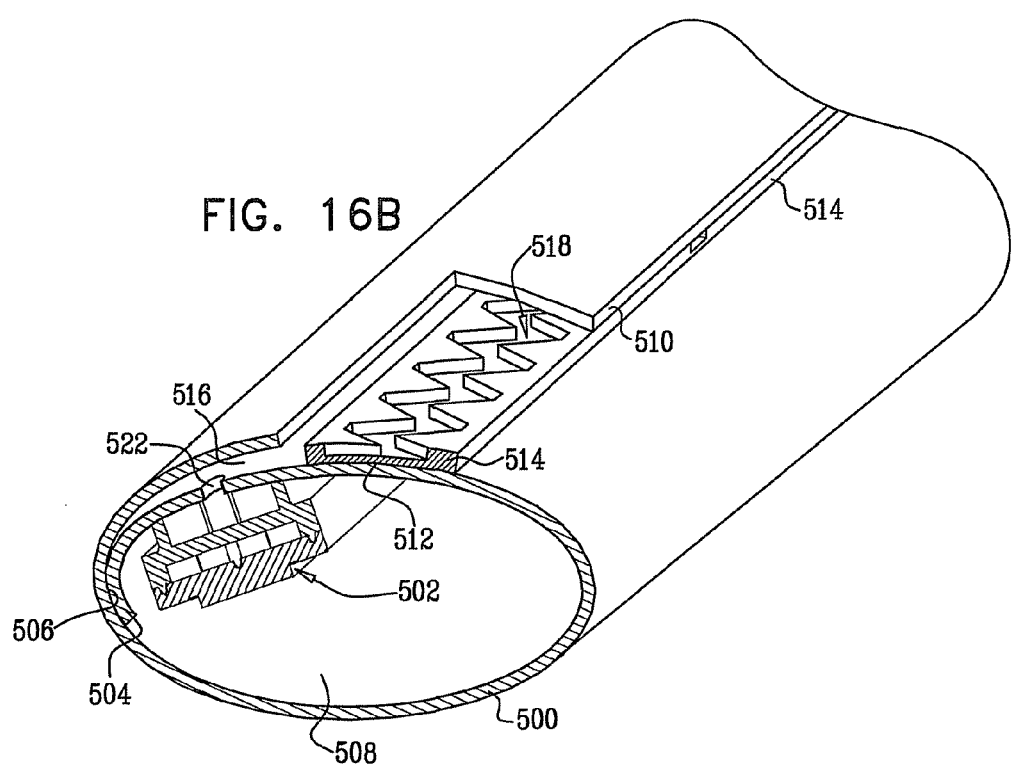

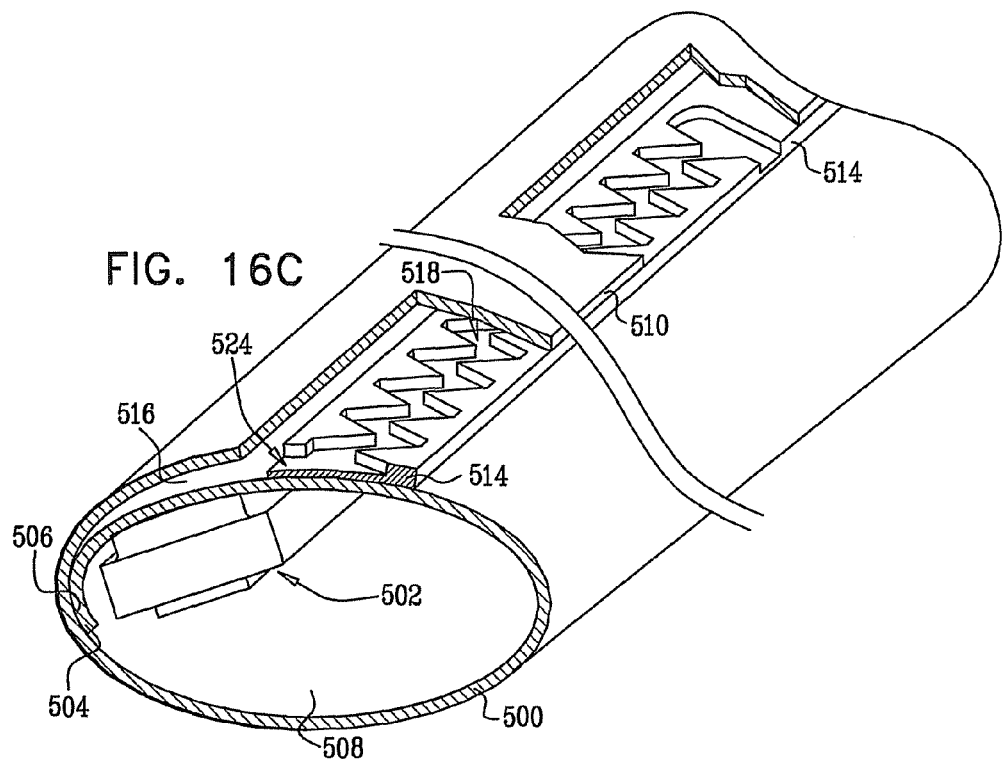
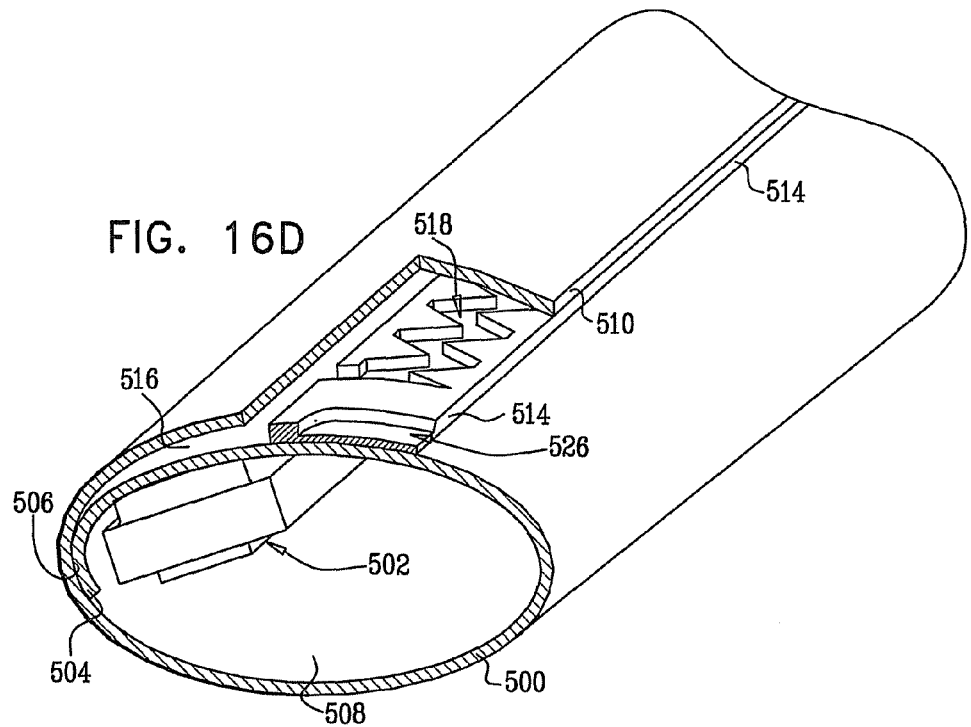

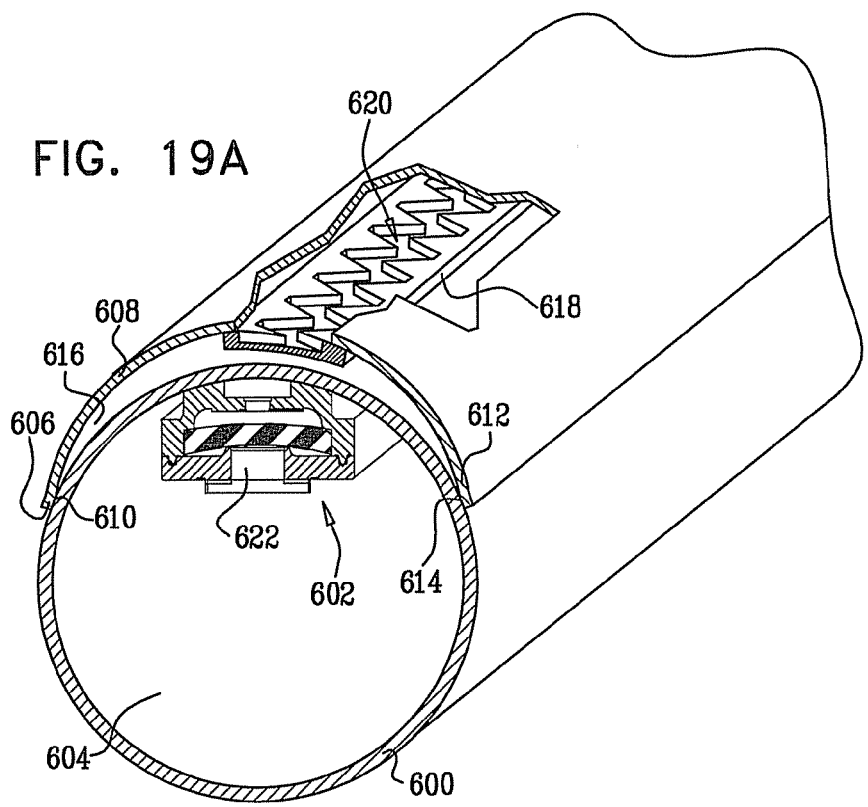
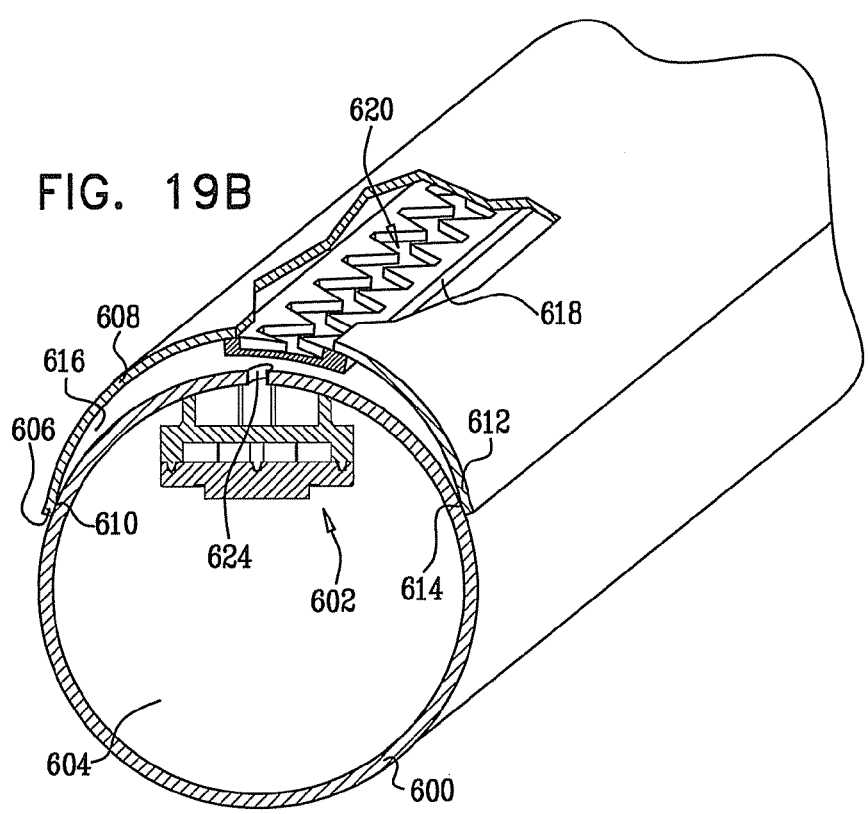

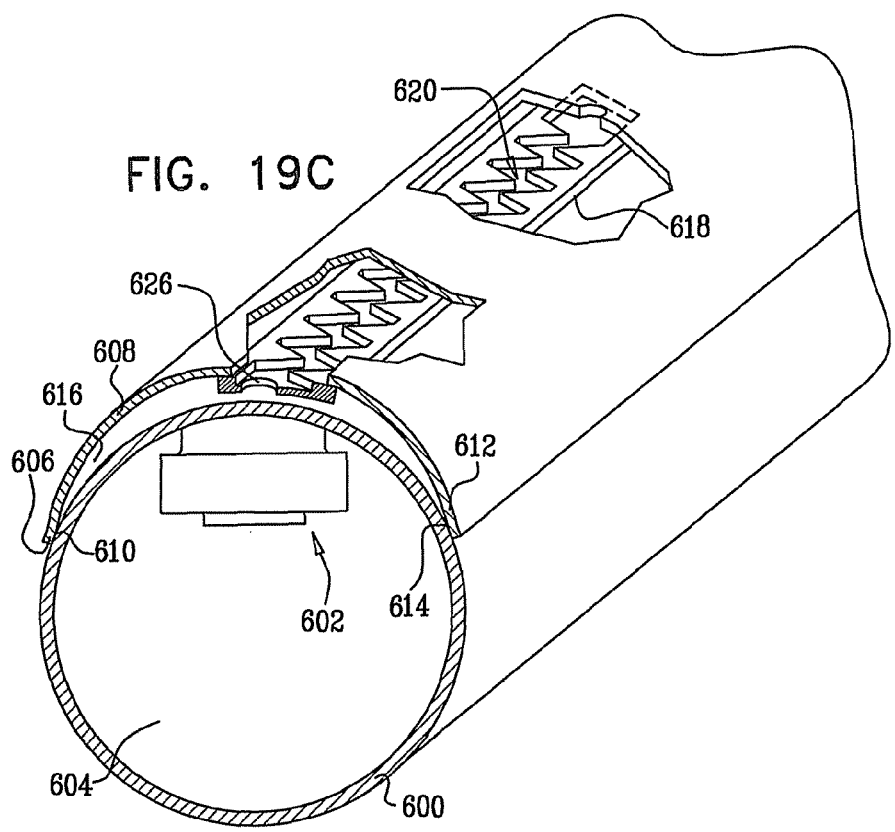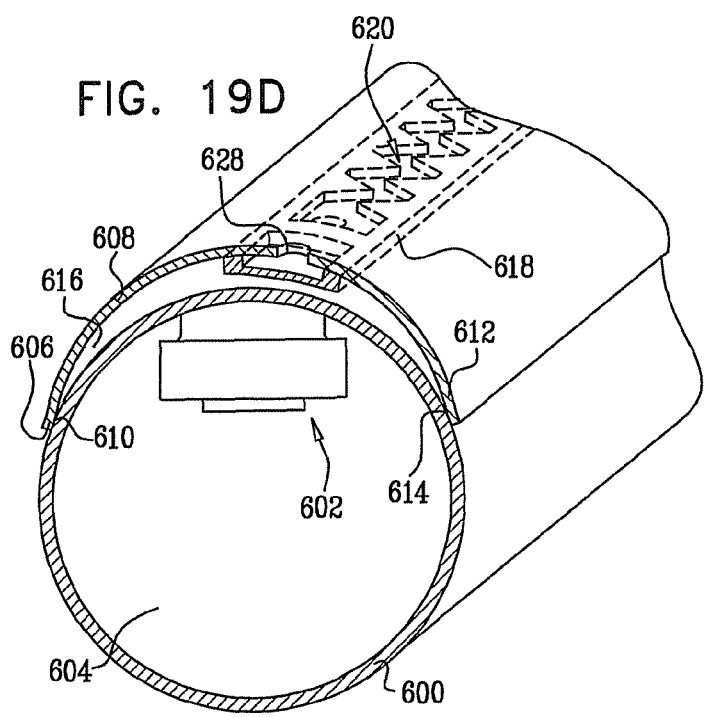

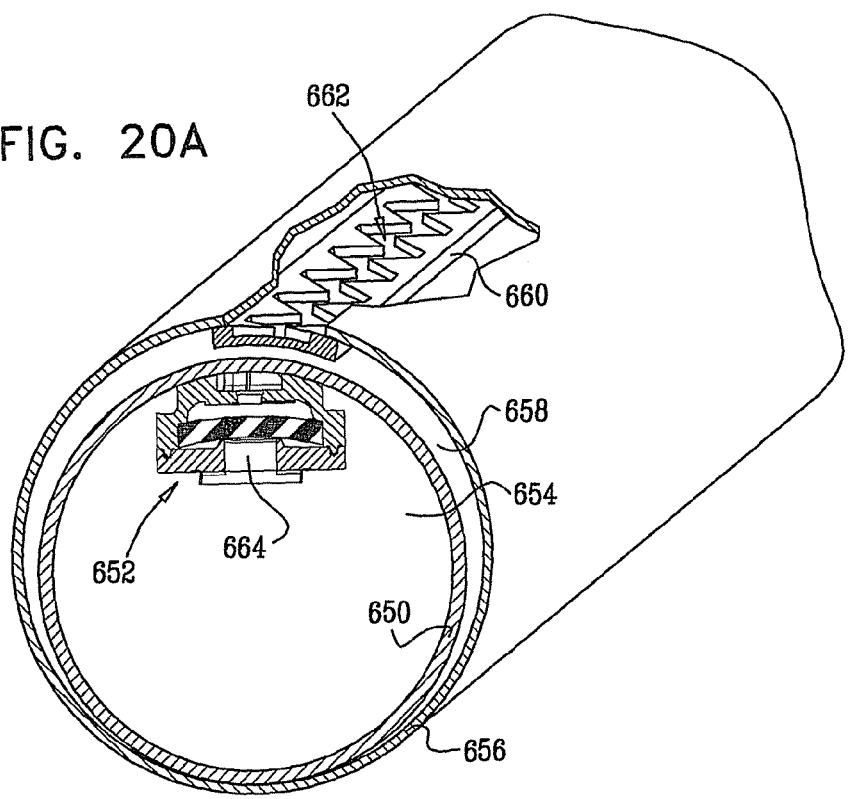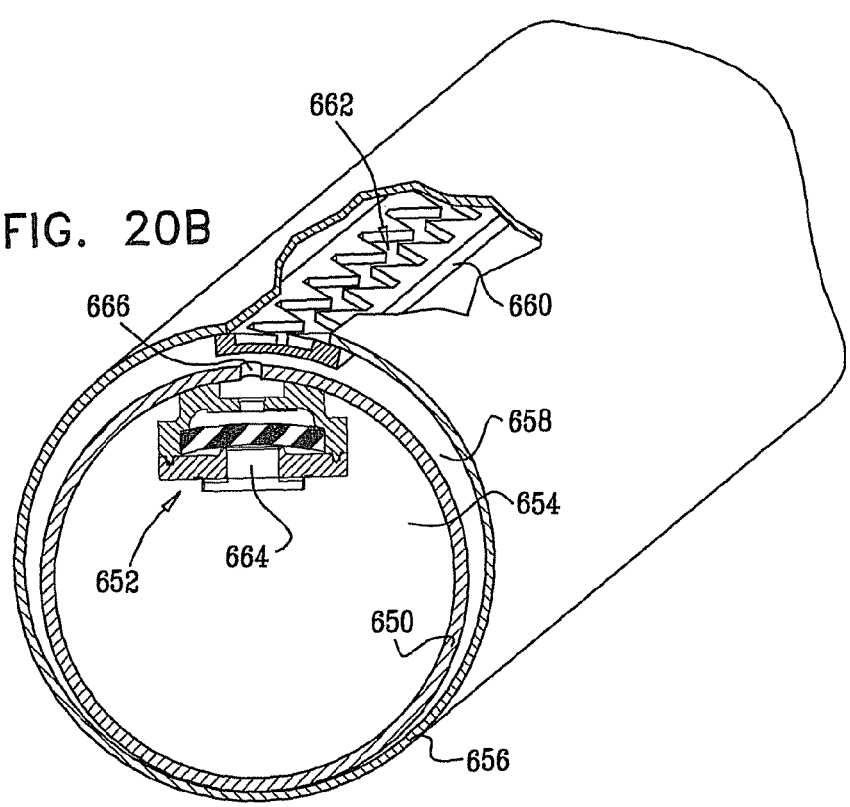

DRIP IRRIGATION APPARATUS

REFERENCE TO RELATED APPLICATIONS

The present application is related to U.S. Provisional Patent Application Ser. No. 60/732,611, filed Nov. 1, 2005 and entitled DRIP IRRIGATION APPARATUS, the disclosure of which is hereby incorporated by reference and priority of which is hereby claimed pursuant to 37 CFR 1.78(a) (4) and (5)(i).

FIELD OF THE INVENTION

The present invention relates to drip irrigation apparatus and methods of manufacture thereof.

BACKGROUND OF THE INVENTION

The following patent publications are believed to represent the current state of the art:
U.S. Pat. Nos. 4,177,946; 4,285,472; 4,430,020; 4,473,191; 4,534,515; 4,874,132; 5,106,021; 5,615,838; 6,027,048; 6,206,305 and 6,382,530.

SUMMARY OF THE INVENTION

The present invention seeks to provide improved drip irrigation apparatus and methods of manufacture thereof.

There is thus provided in accordance with a preferred embodiment of the present invention drip irrigation apparatus including a main water flow channel having associated therewith along a length thereof a plurality of pressure-controlled drip irrigation emitter units and at least one secondary water flow channel extending generally parallel to the main water flow channel and receiving water from at least one of the plurality of pressure-controlled drip irrigation emitter units, the at least one secondary water flow channel having water outlets disposed along the length of the main water flow channel, intermediate the plurality of pressure-controlled drip irrigation emitter units.

In accordance with a preferred embodiment of the present invention the at least one secondary water flow channel includes at least one of a weeping hose and a sweat irrigation hose. Preferably, the at least one secondary water flow channel has associated therewith at least one pressure reducing pathway, having outlets which correspond to the water outlets.

There is also provided in accordance with another preferred embodiment of the present invention drip irrigation apparatus including a main water flow channel having associated therewith along a length thereof a plurality of pressure-controlled drip irrigation emitter units, at least one secondary water flow channel extending generally parallel to the main water flow channel and receiving water from at least one of the plurality of pressure-controlled drip irrigation emitter units and at least one pressure-reducing pathway associated with each of the at least one secondary water flow channel and distributed therealong, the at least one pressure-reducing pathway having outlets disposed along the length of the main water flow channel, intermediate the plurality of pressure-controlled drip irrigation emitter units.

In accordance with a preferred embodiment of the present invention the outlets are defined by welding. Preferably, the at least one pressure reducing pathway includes a series of discrete labyrinths each having an inlet and an outlet. Additionally, the discrete labyrinths are realized by embossing of the at least one secondary water flow channel. Alternatively, the discrete labyrinths are realized by attaching discrete labyrinth elements to the at least one secondary water flow channel.

In accordance with another preferred embodiment of the present invention the at least one pressure reducing pathway includes a generally continuous series of non-mutually communicating labyrinths, each having an inlet and an outlet. Preferably, the non-mutually communicating labyrinths are realized by embossing of the at least one secondary water flow channel. Additionally or alternatively, the inlet faces the at least one secondary water flow channel and the outlet faces away from the at least one secondary water flow channel.

In accordance with yet another preferred embodiment of the present invention the at least one pressure reducing pathway includes a generally continuous labyrinth, having multiple inlets and multiple outlets. Preferably, the multiple outlets are generally evenly spaced on either side of each of the multiple inlets. Additionally or alternatively, two of the multiple outlets are provided for each of the multiple inlets. As a further addition or alternative, the multiple inlets face the at least one secondary water flow channel and the multiple outlets face away from the at least one secondary water flow channel.

In accordance with still another preferred embodiment of the present invention at least one of the plurality of pressure-controlled drip irrigation emitter units includes a low pressure leakage prevention feature. Preferably, at least one of the plurality of pressure-controlled drip irrigation emitter units includes an inlet aperture, a raised wall having a rim, the raised wall and the rim surrounding the inlet aperture and an elastic element operative to be displaced when water pressure in the main water flow channel exceeds a predetermined threshold, and to be in sealed engagement with the rim of the raised wall when water pressure in the main water flow channel does not exceed the predetermined threshold. Additionally or alternatively, at least one of the plurality of pressure-controlled drip irrigation emitter units includes two mutually sealed portions.

In accordance with a further preferred embodiment of the present invention a first one of the two mutually sealed portions includes a circumferential raised elongate portion and an internal raised elongate portion extending between two sections of the at least one pressure-reducing pathway, and a second one of the two mutually sealed portions includes a circumferential elongate recess and an internal elongate recess, the two mutually sealed portions being sealed by engagement of the raised elongate portions with the elongate recesses. Preferably, the raised elongate portions have a generally triangular cross section, and the elongate recesses have a generally rectangular cross section. Additionally or alternatively, the two mutually sealed portions are sealed ultrasonically.

In accordance with a yet further preferred embodiment of the present invention the two mutually sealed portions are sealed ultrasonically along the raised elongate portions and the elongate recesses. Preferably, at least one of the two mutually sealed portions and the at least one pressure reducing pathway is not deformed by ultrasonic sealing of the raised elongate portions and the elongate recesses. Additionally or alternatively, dimensions of at least one of the two mutually sealed portions and the at least one pressure reducing pathway are not changed by ultrasonic sealing of the raised elongate portions and the elongate recesses.

In accordance with a still further preferred embodiment of the present invention the at least one pressure reducing pathway maintains its functionality even when sealing between inwardly facing sides of the two mutually sealed portions is incomplete. Preferably, the first one of the two mutually sealed portions includes a circumferential raised wall and an internal raised wall having a protrusion therebetween, the protrusion being operative to at least partially prevent particular matter from flowing into the at least one pressure reducing pathway.

In accordance with an additional preferred embodiment of the present invention the raised wall includes a non-circular wall, and the rim is configured such that at a predetermined threshold pressure across the elastic element, the elastic element transitions from generally complete circumferential disengagement with the rim to generally complete circumferential engagement with the rim. Preferably, the rim is configured such that at a second predetermined threshold pressure across the elastic element, the elastic element transitions from generally complete circumferential engagement with the rim to generally complete circumferential disengagement with the rim. Additionally or alternatively the rim of the non-circular wall is non-planar.

In accordance with another preferred embodiment of the present invention the main water flow channel is defined by welding of one elongate edge of a sheet to an interior location therealong. Preferably, the at least one secondary water flow channel is defined by welding of another elongate edge of the sheet to a labyrinth defining strip which is welded to the sheet at an exterior location therealong.

In accordance with yet another preferred embodiment of the present invention the main water flow channel is defined by welding of first and second elongate edges of a first sheet at a seam location. Preferably, the at least one secondary water flow channel is defined by welding of a first elongate edge of a second sheet to the first elongate edge of the first sheet at the seam location and by welding a second elongate edge of the second sheet to a labyrinth defining strip which is welded to the first sheet at an exterior location therealong.

In accordance with still another preferred embodiment of the present invention the main water flow channel is defined by an elongate tube. Preferably, the at least one secondary water flow channel is defined by welding of a first elongate edge of a sheet to the elongate tube at a first exterior location therealong and by welding of a second elongate edge of the sheet to a labyrinth defining strip which is welded to the elongate tube at a second exterior location therealong. Alternatively, the at least one secondary water flow channel is defined by welding of a first elongate edge of a sheet to the elongate tube at a first exterior location therealong and by welding of a second elongate edge of the sheet to the elongate tube at a second exterior location therealong, the sheet having a labyrinth defining strip welded at a surface thereof which faces an exterior surface of the elongate tube.

As a further alternative, the at least one secondary flow channel is defined by a second elongate tube surrounding the elongate tube, the second elongate tube having welded at a first location of an interior surface thereof a labyrinth defining strip and being welded at a second location of the interior surface thereof to an outer surface of the elongate tube.

In accordance with a further preferred embodiment of the present invention the main water flow channel has welded at an interior location therealong at least one of the plurality of pressure-controlled drip irrigation emitter unit. Preferably, the at least one secondary water flow channel includes material having at least one of weeping hose functionality and sweat irrigation functionality.

There is further provided in accordance with a further preferred embodiment of the present invention a pressure-controlled drip irrigation emitter element including a water inlet, an inlet control chamber receiving water from the water inlet via an inlet aperture, a pressure reducing pathway receiving water from the inlet control chamber, an outlet control chamber receiving water from the pressure reducing pathway, an elastic element separating the inlet control chamber and the outlet control chamber and a non-circular wall surrounding the inlet aperture and having a rim, the rim being configured such that at a predetermined threshold pressure across the elastic element, the elastic element transitions from generally complete circumferential disengagement with the rim to generally complete circumferential engagement with the rim.

There is additionally provided in accordance with an additional preferred embodiment of the present invention a pressure-controlled drip irrigation emitter element including a water inlet, an inlet control chamber receiving water from the water inlet via an inlet aperture, a pressure reducing pathway receiving water from the inlet control chamber, an outlet control chamber receiving water from the pressure reducing pathway and an elastic element separating the inlet control chamber and the outlet control chamber, the inlet control chamber, the outlet control chamber and the pressure reducing pathway being defined by ultrasonic sealing of first and second emitter element portions in a manner such that the dimensions of the pressure reducing pathway are not affected.

In accordance with a preferred embodiment of the present invention the inlet aperture is surrounded by a non-circular wall having a rim, the rim being configured such that at a predetermined threshold pressure across the elastic element, the elastic element transitions from generally complete circumferential disengagement with the rim to generally complete circumferential engagement with the rim. Preferably, the rim is configured such that at a second predetermined threshold pressure across the elastic element, the elastic element transitions from generally complete circumferential engagement with the rim to generally complete circumferential disengagement with the rim.

In accordance with another preferred embodiment of the present invention the rim of the non-circular wall is non-planar. Preferably, one of the first and second emitter element portions includes a raised elongate portion and another of the first and second emitter element portions includes a corresponding elongate recess, the raised elongate portion and the elongate recess being ultrasonically welded together. Additionally or alternatively, the raised elongate portion has a generally triangular cross section and the elongate recess has a generally rectangular cross section.

In accordance with still another preferred embodiment of the present invention the one of the first and second emitter element portions also includes an internal raised elongate portion extending between two sections of the pressure-reducing pathway, and the another of the first and second emitter element portions also includes a corresponding internal elongate recess, the internal raised elongate portion and the internal elongate recess being ultrasonically welded together. Preferably, the internal raised elongate portion has a generally triangular cross section and the internal elongate recess has a generally rectangular cross section.

In accordance with yet another preferred embodiment of the present invention the pressure reducing pathway maintains its functionality even when sealing between inwardly facing sides of the two mutually sealed portions is incomplete. Preferably, one of the first and second emitter element portions includes a circumferential raised wall and an internal raised wall having a protrusion therebetween, the protrusion being operative to at least partially prevent particular matter from flowing into the pressure reducing pathway.

There is also provided in accordance with another preferred embodiment of the present invention a pressure-controlled drip irrigation emitter element disposed along an interior wall of a water supply tube including a water inlet coupled to the interior wall of the water supply tube, an inlet control chamber receiving water from the water inlet via an inlet aperture, a pressure reducing pathway receiving water from the inlet control chamber, the pressure reducing pathway being separated from the interior wall of the water supply tube, an outlet control chamber receiving water from the pressure reducing pathway via a pressure reducing pathway outlet passage and an elastic element separating the inlet control chamber and the outlet control chamber, the pressure reducing pathway outlet passage extending from the pressure reducing pathway, along a pathway extending between the emitter element and the interior wall of the water supply tube, and to the outlet control chamber.

In accordance with a preferred embodiment of the present invention the inlet aperture is surrounded by a non-circular wall having a rim, the rim being configured such that at a predetermined threshold pressure across the elastic element, the elastic element transitions from generally complete circumferential disengagement with the rim to generally complete circumferential engagement with the rim. Preferably, the rim is configured such that at a second predetermined threshold pressure across the elastic element, the elastic element transitions from generally complete circumferential engagement with the rim to generally complete circumferential disengagement with the rim.

In accordance with another preferred embodiment of the present invention the rim of the non-circular wall is non-planar. Preferably, the inlet control chamber, the outlet control chamber and the pressure reducing pathway are defined by ultrasonic sealing of first and second emitter element portions in a manner such that the dimensions of the pressure reducing pathway are not affected. Additionally or alternatively, the first and second emitter element portions includes a raised elongate portion and another of the first and second emitter element portions includes a corresponding elongate recess, the raised elongate portion and the elongate recess being ultrasonically welded together.

In accordance with yet another preferred embodiment of the present invention the raised elongate portion has a generally triangular cross section and the elongate recess has a generally rectangular cross section. Preferably, the one of the first and second emitter element portions also includes an internal raised elongate portion extending between two sections of the pressure-reducing pathway, and the another of the first and second emitter element portions also includes a corresponding internal elongate recess, the internal raised elongate portion and the internal elongate recess being ultrasonically welded together. Additionally or alternatively, the internal raised elongate portion has a generally triangular cross section and the internal elongate recess has a generally rectangular cross section.

In accordance with a further preferred embodiment of the present invention the pressure reducing pathway maintains its functionality even when sealing between inwardly facing sides of the two mutually sealed portions is incomplete. Preferably, one of the first and second emitter element portions includes a circumferential raised wall and an internal raised wall, having a protrusion therebetween, the protrusion being operative to at least partially prevent particular matter from flowing into the pressure reducing pathway.

BRIEF DESCRIPTION OF THE DRAWINGS

The present invention will be understood and appreciated more fully from the following detailed description, taken in conjunction with the drawings in which:

FIGS. 15A, 15B, 15C and 15D are generally to-scale simplified illustrations which correspond to FIGS. 14B and 14C in the context of the drip irrigation emitter element of FIGS.

Figure 1:
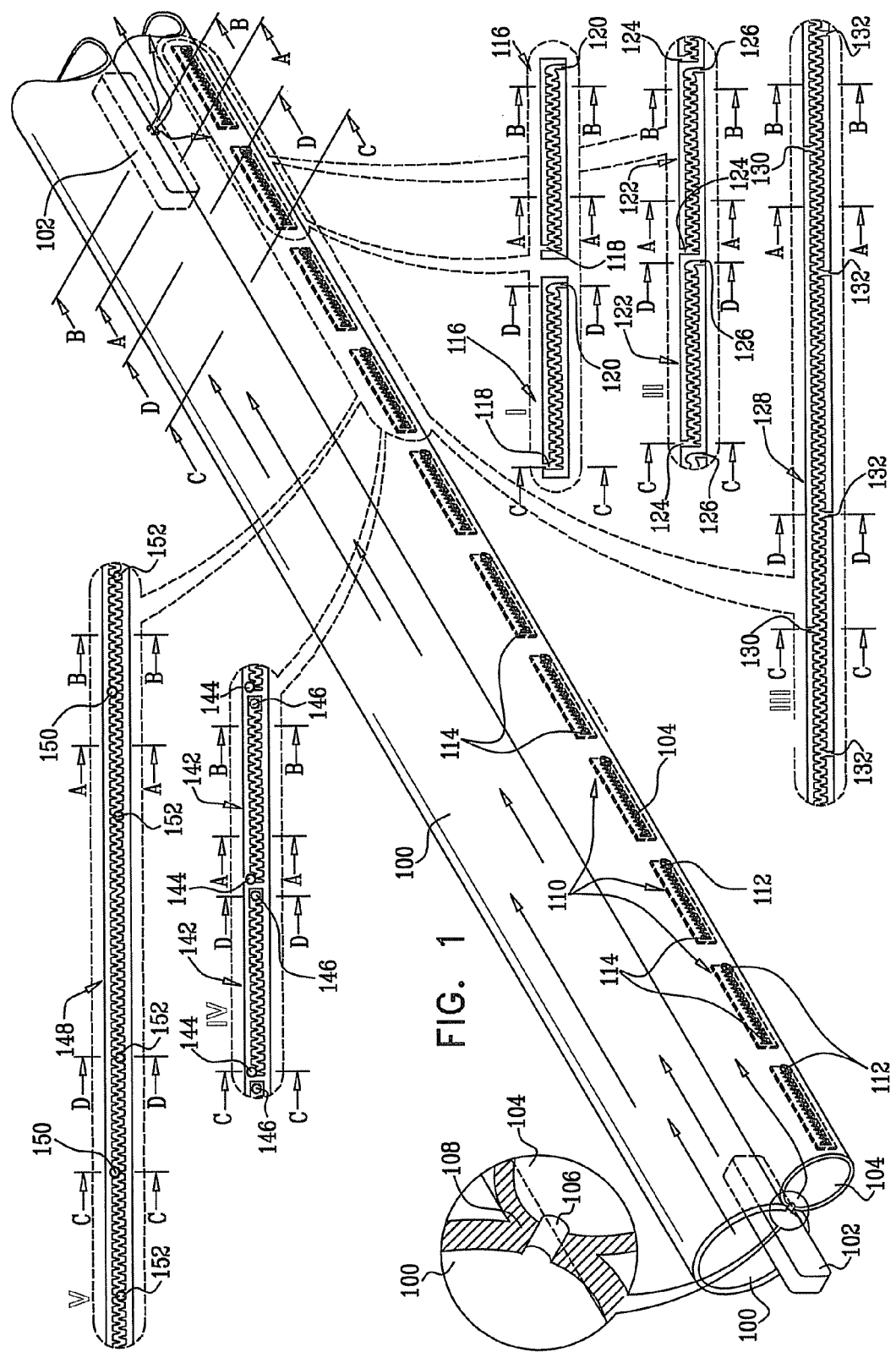
FIG. 1 is a simplified, general schematic illustration of drip irrigation apparatus constructed and operative in accordance with a preferred embodiment of the present invention.
Figure 15B:
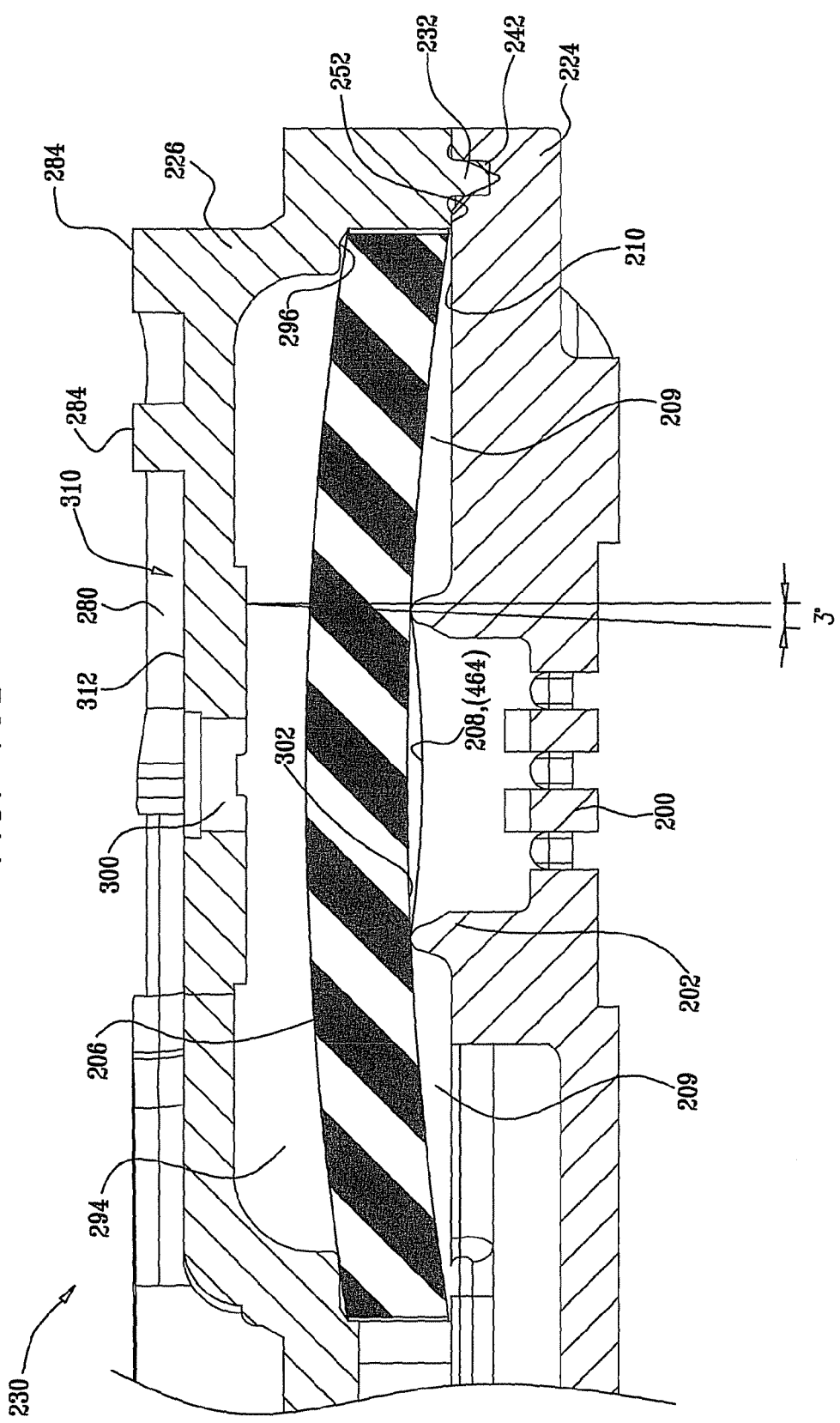
Figure 15C:
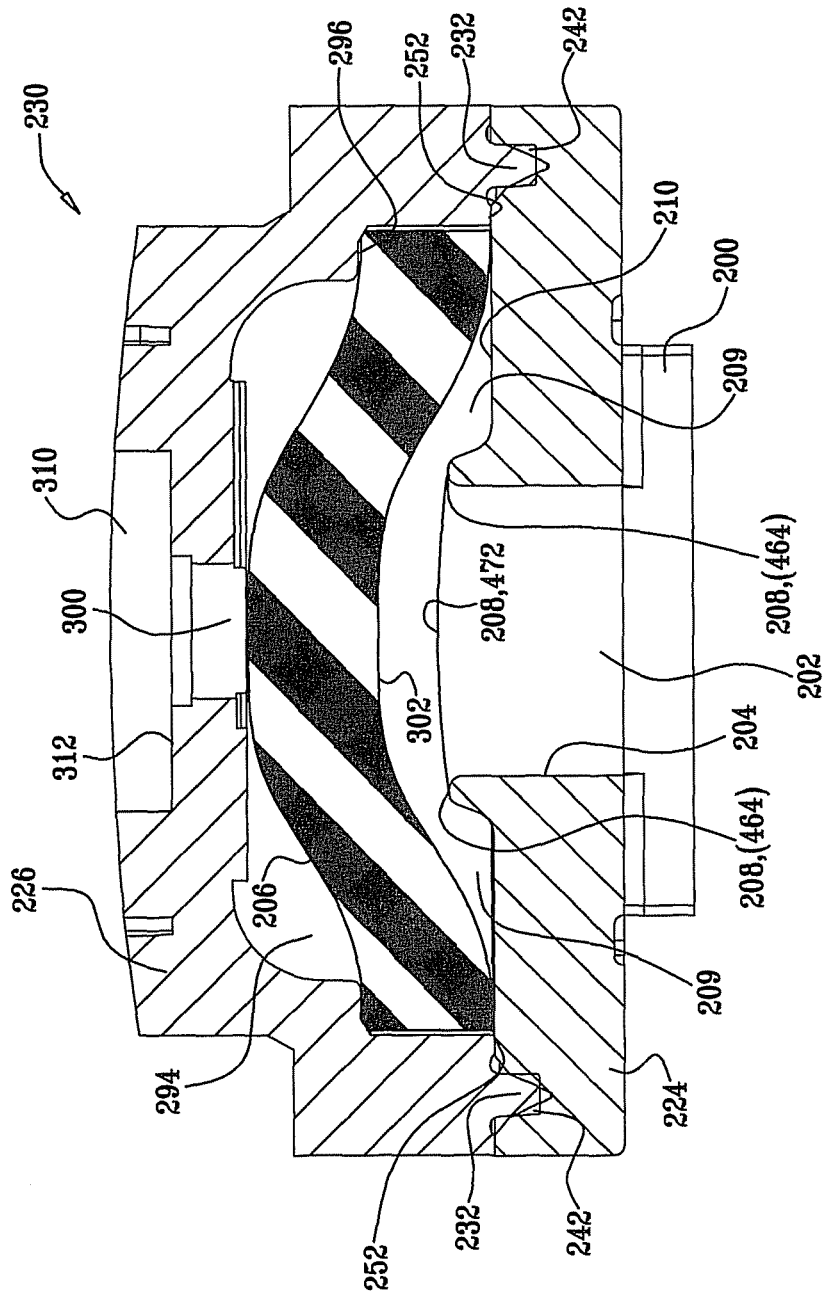
Figure 15D:
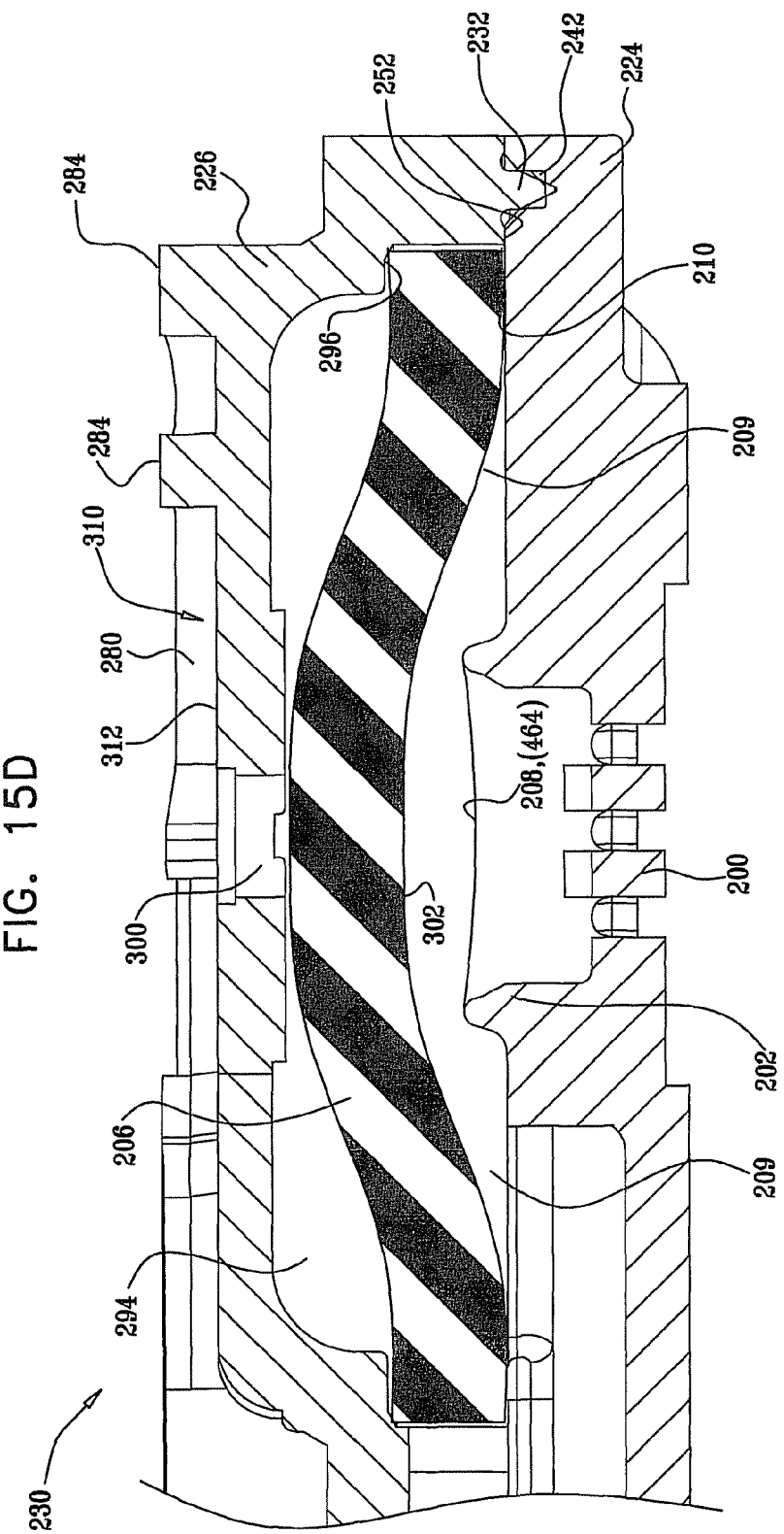

2A-10, FIGS. 15A and 15B showing a first operative orientation of the drip irrigation emitter element and FIGS. 15C and 15D showing a second operative orientation of the drip irrigation emitter element;

FIGS. 16A, 16B, 16C and 16D are simplified sectional illustrations of drip irrigation apparatus constructed and operative in accordance with a preferred embodiment of the present invention, taken at locations indicated by respective arrows A, B, C and D in the general schematic illustration of FIG. 1;

FIGS. 17A, 17B, 17C and 17D are simplified sectional illustrations of drip irrigation apparatus constructed and operative in accordance with another preferred embodiment of the present invention, taken at locations indicated by respective arrows A, B, C and D in the general schematic illustration of FIG. 1;

FIGS. 18A, 18B, 18C and 18D are simplified sectional illustrations of drip irrigation apparatus constructed and operative in accordance with yet another preferred embodiment of the present invention, taken at locations indicated by respective arrows A, B, C and D in the general schematic illustration of FIG. 1;

FIGS. 19A, 19B, 19C and 19D are simplified sectional illustrations of drip irrigation apparatus constructed and operative in accordance with still another preferred embodiment of the present invention, taken at locations indicated by respective arrows A, B, C and D in the general schematic illustration of FIG. 1; and FIGS. 20A, 20B, 20C and 20D are simplified sectional illustrations of drip irrigation apparatus constructed and operative in accordance with a further preferred embodiment of the present invention, taken at locations indicated by respective arrows A, B, C and D in the general schematic illustration of FIG. 1.

DETAILED DESCRIPTION OF PREFERRED EMBODIMENTS

Reference is now made to FIG. 1, which is a simplified, general schematic illustration of drip irrigation apparatus constructed and operative in accordance with a preferred embodiment of the present invention. FIG. 1 shows a main water flow channel 100 having disposed at longitudinally spaced locations therealong, typically separated from each other by approximately one meter, a plurality of pressure-controlled drip irrigation emitter elements 102, which preferably include a low pressure leakage prevention feature. Each drip irrigation emitter element 102 provides a pressure-compensated liquid flow output to a secondary water flow channel 104, which extends generally parallel to main water flow channel 100, via a pressure-compensated emitter element output aperture 106 formed in a common wall 108, joining main water flow channel 100 and secondary water flow channel 104.

At least one longitudinally spaced secondary water flow channel labyrinth 110 communicates with secondary water flow channel 104 and provides a reduced pressure output at multiple water outlets 112 which communicate with the outside of the secondary water flow channel 104. Preferably a plurality of inlets 114 are provided to the at least one longitudinally spaced secondary water flow channel labyrinth 110 along the length thereof. Outlets 112 and inlets 114 are typically defined by welding or by other manufacturing techniques. Typically water outlets 112 are separated from each other by 10 cm. Alternatively, secondary water flow channel 104 may be a weeping hose, such as a weeping hose of the type described in U.S. Pat. No. 5,299,885, the content of which is incorporated herein by reference, or such as an Aquapore weeping hose commercially available from Aquapore Moisture Systems, Inc. of Pheonix, Ariz. Alternatively, secondary water flow channel 104 may be any type of hose suitable for sweat irrigation.

FIG. 1 includes five enlargements showing five alternative labyrinth structures. An enlargement designated by Roman numeral I shows the at least one longitudinally spaced secondary water flow channel labyrinth 110 implemented as a series of discrete labyrinths 116, each having an inlet 118 and an outlet 120. The discrete labyrinths 116 may be realized by embossing of the secondary water flow channel 104 or alternatively by attaching discrete labyrinth elements to the secondary water flow channel 104.

An enlargement designated by Roman numeral II shows the at least one longitudinally spaced secondary water flow channel labyrinth 110 implemented as a generally continuous series of non-mutually communicating labyrinths 122, each having an inlet 124 and an outlet 126. The generally continuous series of non-mutually communicating labyrinths 122 may be realized by embossing of the secondary water flow channel 104.

An enlargement designated by Roman numeral III shows the at least one longitudinally spaced secondary water flow channel labyrinth 110 implemented as a generally continuous labyrinth 128, having multiple inlets 130 and outlets 132. Preferably, the outlets 132 are generally evenly spaced on either side of each inlet 130. Typically two outlets 132 are provided for each inlet 130.

An enlargement designated by Roman numeral IV shows the at least one longitudinally spaced secondary water flow channel labyrinth 110 implemented as a generally continuous series of non-mutually communicating labyrinths 142, each having an inlet 144 facing the secondary water flow channel 104 and an outlet 146 facing in an opposite direction, away from the secondary water flow channel 104. The generally continuous series of non-mutually communicating labyrinths 142 may be realized by embossing of the secondary water flow channel 104.

An enlargement designated by Roman numeral V shows the at least one longitudinally spaced secondary water flow channel labyrinth 110 implemented as a generally continuous labyrinth 148, having multiple inlets 150 facing the secondary water flow channel 104 and multiple outlets 152 facing in an opposite direction, away from the secondary water flow channel 104. Preferably, the outlets 152 are generally evenly spaced on either side of each inlet 150. Typically two outlets 152 are provided for each inlet 150.

Figure 2A:
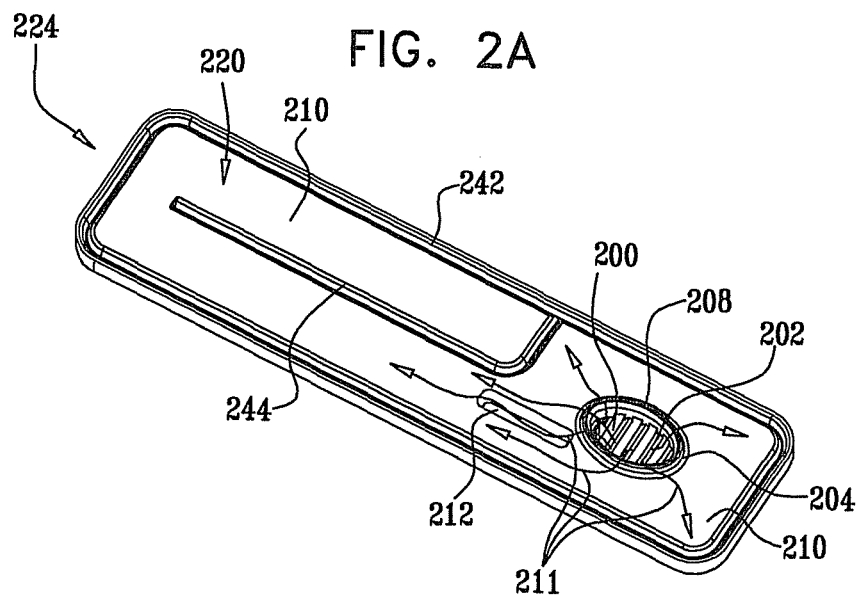
FIGS. 2A and 2B are simplified pictorial illustrations of first and second sides of a first portion of a drip irrigation emitter element useful in the drip irrigation apparatus of FIG. 1.
Figure 2B:
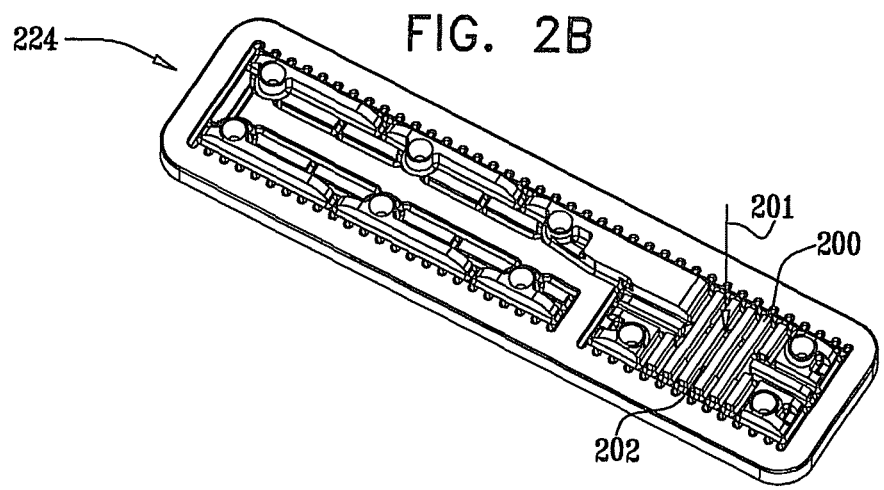
Figure 3A:
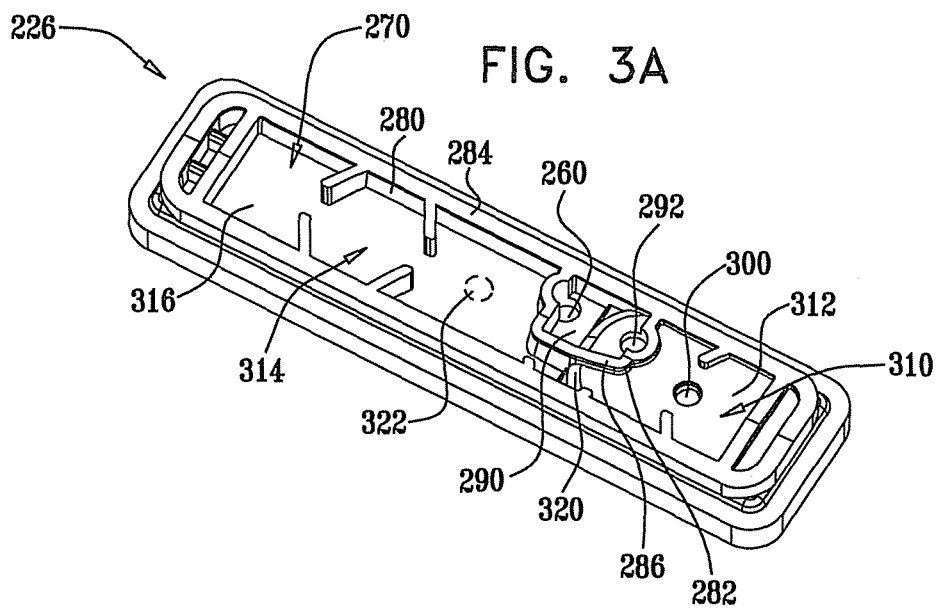
FIGS. 3A and 3B are simplified pictorial illustrations of first and second sides of a second portion of the drip irrigation emitter element useful in the drip irrigation apparatus of FIG. 1.
Figure 3B:
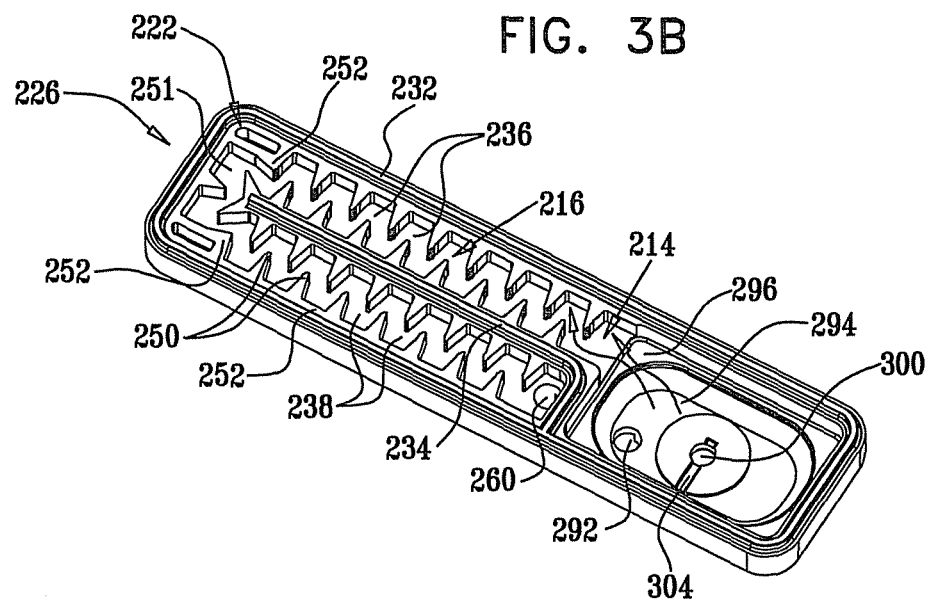
Figure 4:
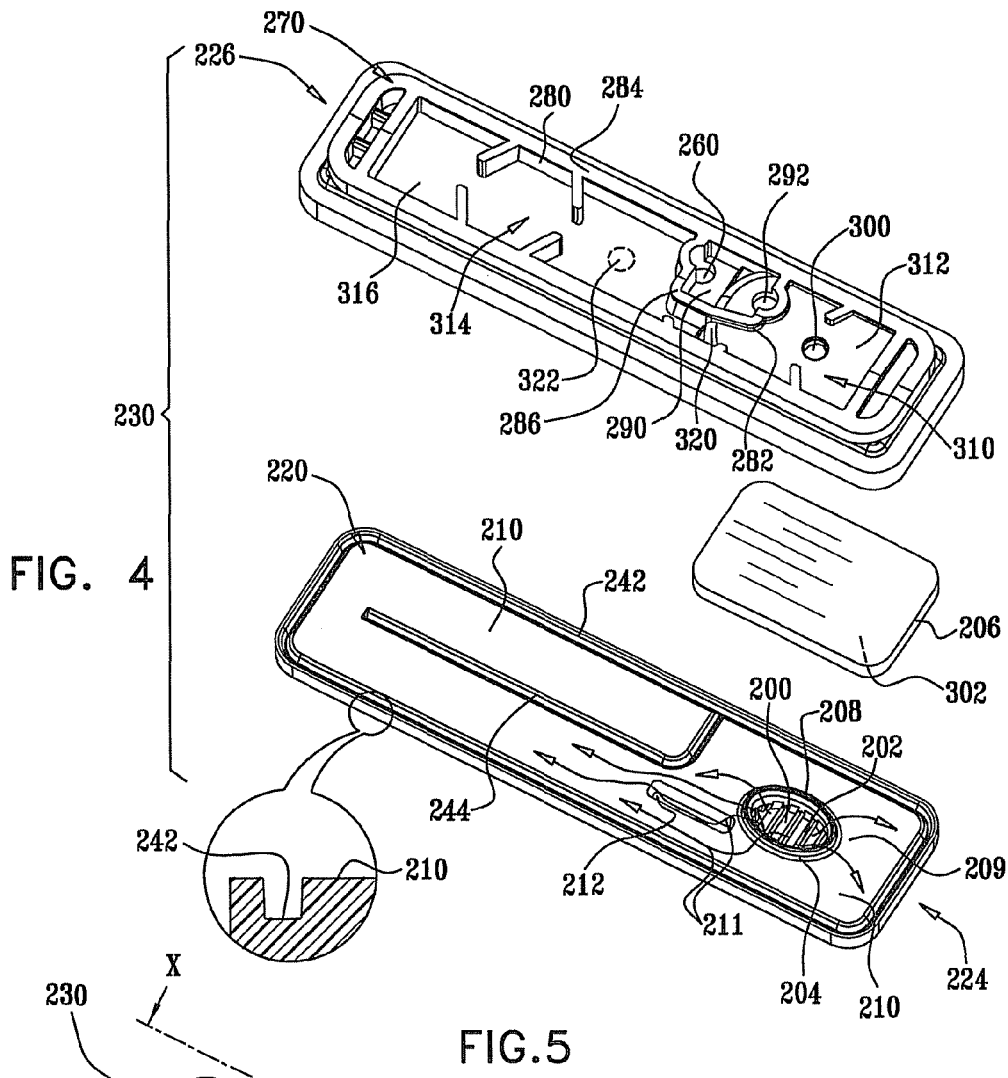
FIG. 4 is a first simplified exploded view illustration of the drip irrigation emitter element of FIGS. 2A-3B.
Figure 5:
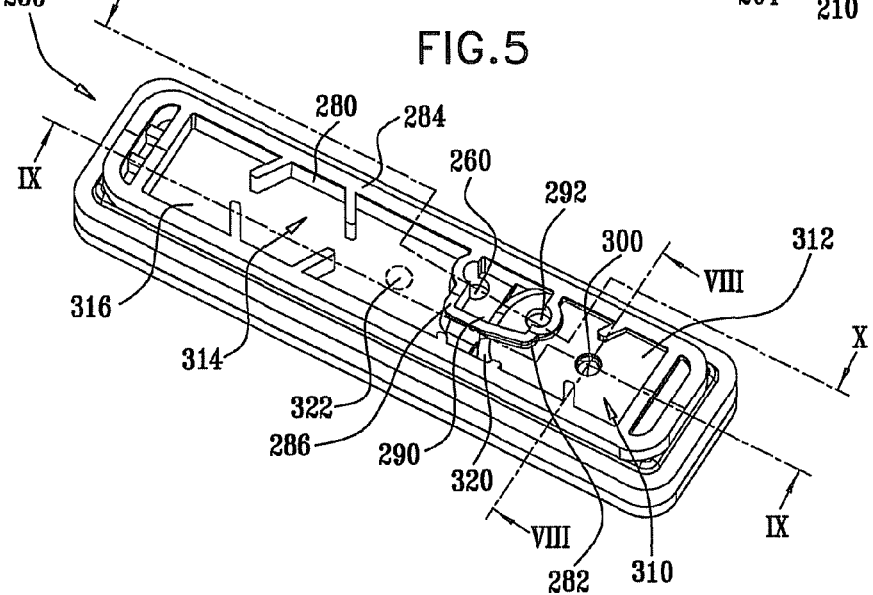
FIG. 5 is a first simplified assembled view illustration of the drip irrigation emitter element of FIG. 4.
Figure 6:
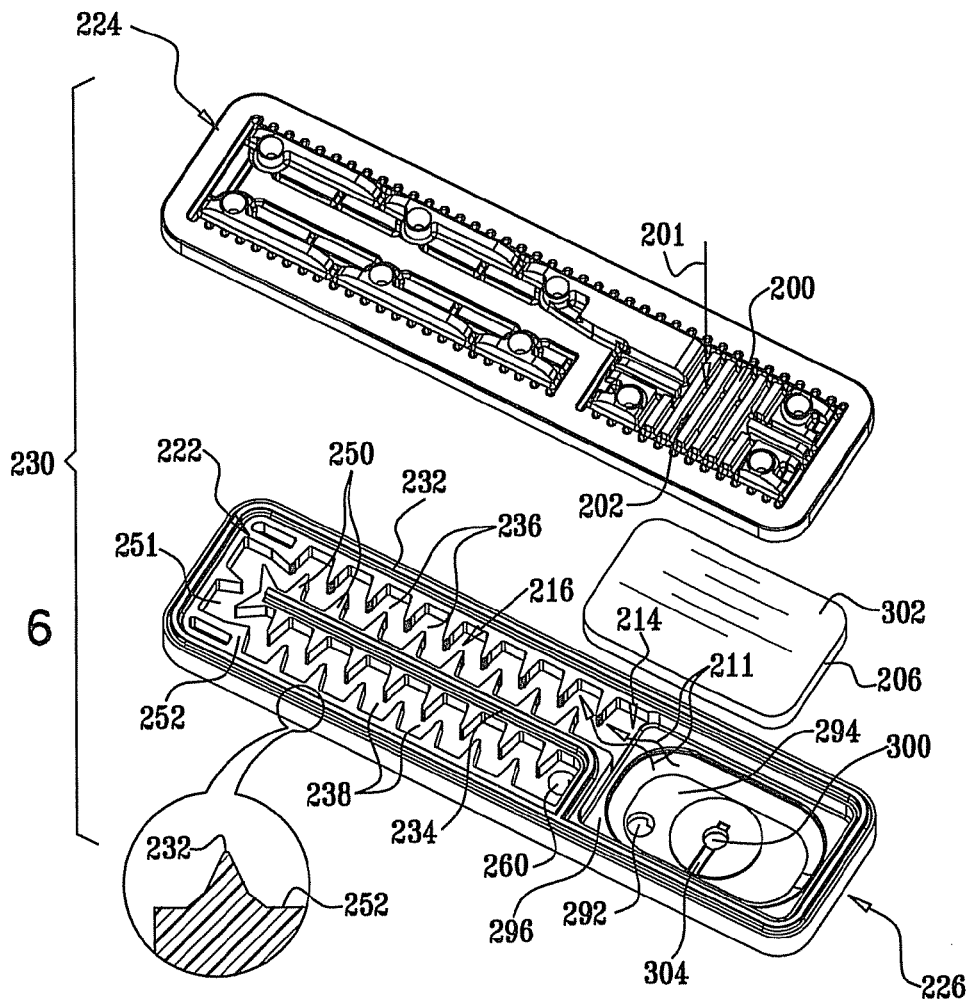
FIG. 6 is a second simplified exploded view illustration of the drip irrigation emitter element of FIGS. 2A-5.
Figure 7:
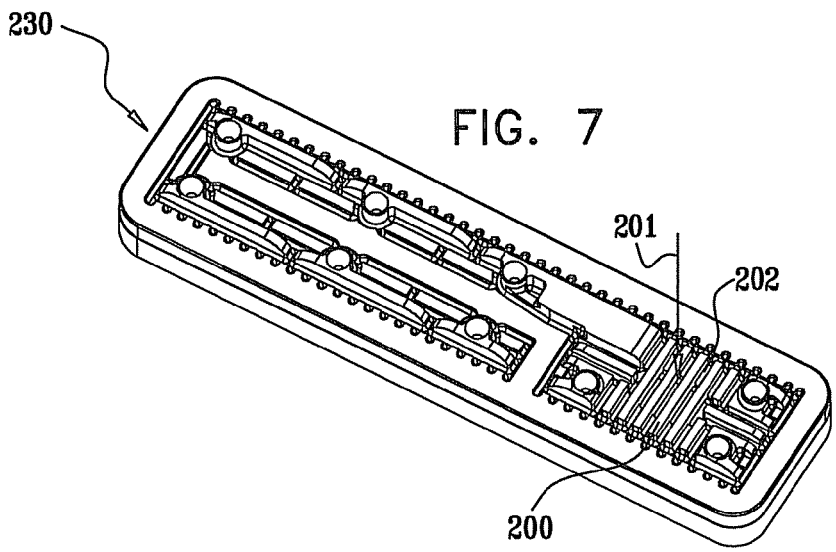
FIG. 7 is a second simplified assembled view illustration of the drip irrigation emitter element of FIG. 6.
Figure 8:
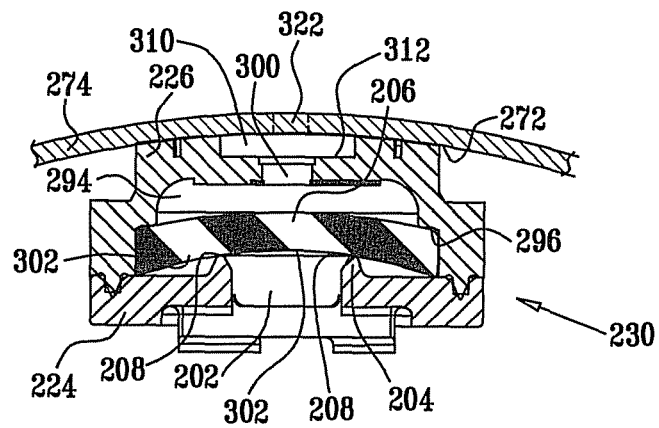
FIG. 8 is a simplified sectional illustration of the drip irrigation emitter element of FIGS. 2A-7, taken along section lines VIII-VIII in FIG. 5, the drip irrigation emitter element being placed inside a drip irrigation line of the general type shown in FIG. 1.
Figure 9:
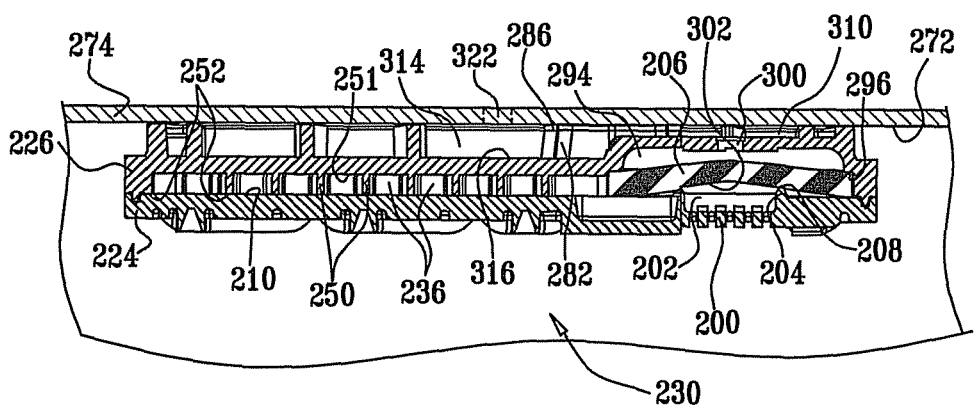
FIG. 9 is a simplified sectional illustration of the drip irrigation emitter element of FIGS. 2A-7, taken along section lines IX-IX in FIG. 5, the drip irrigation emitter element being placed inside a drip irrigation line of the general type shown in FIG. 1.
Figure 10:
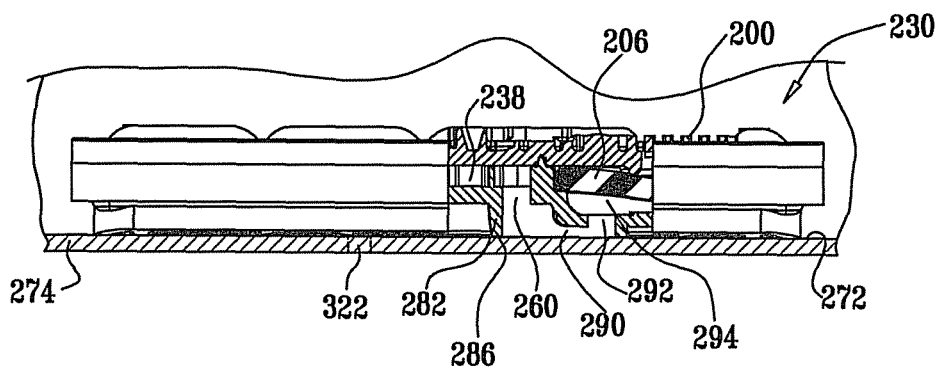
FIG. 10 is a simplified sectional illustration of the drip irrigation emitter element of FIGS. 2A-7, taken along section lines X-X in FIG. 5, the drip irrigation emitter element being placed inside a drip irrigation line of the general type shown in FIG. 1.

Reference is now made to FIGS. 2A and 2B, which are simplified pictorial illustrations of first and second sides of a first portion of a drip irrigation emitter element useful in the drip irrigation apparatus of FIG. 1, to FIGS. 3A and 3B, which are simplified pictorial illustrations of first and second sides of a second portion of the drip irrigation emitter element useful in the drip irrigation apparatus of FIG. 1, to FIG. 4, which is a first simplified exploded view illustration of the drip irrigation emitter element of FIGS. 2A-3B, to FIG. 5, which is a first simplified assembled view illustration of the drip irrigation emitter element of FIG. 4, to FIG. 6, which is a second simplified exploded view illustration of the drip irrigation emitter element of FIGS. 2A-5, to FIG. 7, which is a second simplified assembled view illustration of the drip irrigation emitter element of FIG. 6, and to FIGS. 8, 9 and 10, which are simplified sectional illustrations of the drip irrigation emitter element of FIGS. 2A-7 when placed inside a drip irrigation line of the general type shown in FIG. 1.

Turning initially to FIGS. 4-7, water from main water flow channel 100 (FIG. 1) passes a water filtering grid 200, as indicated by an arrow 201, and through an inlet aperture 202, which aperture is surrounded by a raised wall 204. When the pressure of the water in main water flow channel 100 exceeds a predetermined threshold, preferably 0.5 Atmospheres, the water displaces a generally rectangular planar elastic element 206, which, in the absence of such pressure, lies in sealed engagement with a rim 208 of raised wall 204.

An inlet control chamber 209 is defined by rim 208, a surface 210 and generally rectangular planar elastic element 206. Displacement of generally rectangular planar elastic element 206 from sealed engagement with rim 208 allows water to flow through aperture 202 into inlet control chamber 209, as described further hereinbelow with reference to FIGS. 13A-13D, along surface 210, as indicated by arrows 211, and via a longitudinal recess 212 formed in surface 210 to an inlet 214 of a labyrinthine passageway 216. The structure of the labyrinthine passageway 216 is seen from additional consideration of FIGS. 2A and 3B which illustrate facing, mutually sealed sides 220 and 222 of respective portions 224 and 226 of a drip irrigation emitter element 230, useful as the drip irrigation emitter element 102 (FIG. 1).

Portions 224 and 226 of drip irrigation emitter element 230 are sealed together at a circumferential raised elongate portion 232 to which is connected an internal raised elongate portion 234, which extends between two sections 236 and 238 of pressure-reducing labyrinthine passageway 216. Elongate portions 232 and 234 extend from side 222 of portion 226 and sealingly engage correspondingly located elongate recesses 242 and 244 formed on side 220 of portion 224. Preferably, elongate portions 232 and 234 have a generally triangular cross section as seen in the enlarged portion of FIG. 6, and recesses 242 and 244 have a generally rectangular cross section as seen in the enlarged portion of FIG. 4.

The labyrinthine passageway 216 is defined by a series of tooth-like protrusions 250 which extend from a surface 251 and have a top surface 252. In the assembled drip irrigation emitter element 230, when elongate portions 232 and 234 are sealed to respective elongate recesses 242 and 244, surfaces 210 and 252 lie in mutually touching, preferably sealed engagement. Preferably, the sealing is effected ultrasonically and the dimensions of the circumferential raised elongate portion 232, the internal raised elongate portion 234 and corresponding recesses 242 and 244 are such that ultrasonic sealing thereof does not deform or affect the dimensions or mutual engagement of surfaces 210 and 252 and particularly does not affect the dimensions of the labyrinthine passageway 216.

It is appreciated that sealing between internal elongate portion 234 and corresponding elongate recess 244 is provided such that in the event of incomplete sealing between surfaces 210 and 252, water will not bypass much of the labyrinthine passageway 216 from section 236 to section 238 and from the region lying between surface 210 and elastic element 206 to section 238.

The water flows through the labyrinthine pathway 216 to a labyrinthine pathway outlet 260 and the water pressure is correspondingly reduced by about 0.4 Atmospheres, typically from a line pressure of 0.5 to 4 Atmospheres.

Reference is now made additionally to FIGS. 8-10, which illustrate a side 270, shown with particular clarity in FIG. 3A, of portion 226 of element 230, being sealed to an interior wall surface 272 of a water supply pipe 274, useful as main water flow channel 100 (FIG. 1).

As seen in FIGS. 3A, 4 and 5, a circumferential raised wall 280 and an internal raised wall 282 define respective rims 284 and 286 which are heat welded to interior wall surface 272 (FIG. 8).

Water passes through labyrinthine pathway outlet 260 and enters a chamber 290, from which it exits via an outlet 292 and enters an outlet control chamber 294, formed at side 222 of portion 226 and sealed by generally rectangular planar elastic element 206. Elastic element 206 is supported by a surface 296 which surrounds outlet control chamber 294.

As seen particularly in FIGS. 8-10, generally rectangular planar elastic element 206 governs water flow through an outlet 300 of outlet control chamber 294, as a function of the line pressure applied to generally rectangular planar elastic element 206 at a surface 302 thereof, which surface engages rim 208. Outlet 300 is typically in the form of a circular hole. Preferably, a shallow slot 304, which is seen with particular clarity in FIGS. 3B and 6, is provided in communication with the outlet 300, to assist in providing efficient pressure responsive flow control of water passing through the outlet 300.

Water passing through outlet 300 enters a volume 310, defined between a surface 312 of side 270 and surface 272 of water supply pipe 274, and then passes to a volume 314, defined between a surface 316 of side 270 and surface 272 of water supply pipe 274, via a partial obstruction 320. The partial obstruction 320 is provided for helping to prevent particulate matter from passing back from volume 314 into volume 310.

Water leaves volume 314 via an opening 322 formed in water supply pipe 274, which opening corresponds to pressure-compensated emitter element output aperture 106 (FIG. 1).

Figure 11A:
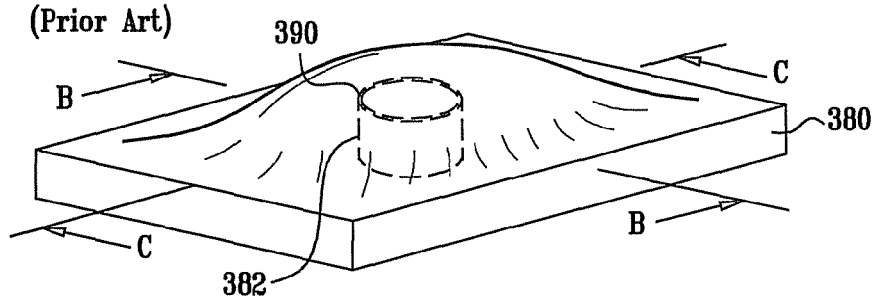
FIGS. 11A, 11B, 11C and 11D are simplified illustrations of a problem in the operation of prior art pressure-controlled anti-leakage drip irrigation emitters, FIG. 11A being a simplified not-to-scale pictorial illustration, FIGS. 11B and 11C being sectional illustrations taken along respective section lines XIB-XIB and XIC-XIC in FIG. 11A, and FIG. 11D being a superposition of portions of FIGS. 11B and 11C.
Figure 11B:
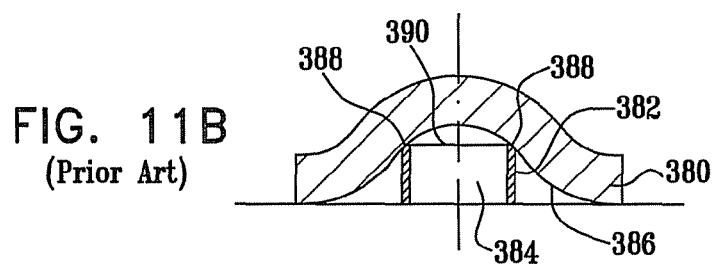
Figure 11C:
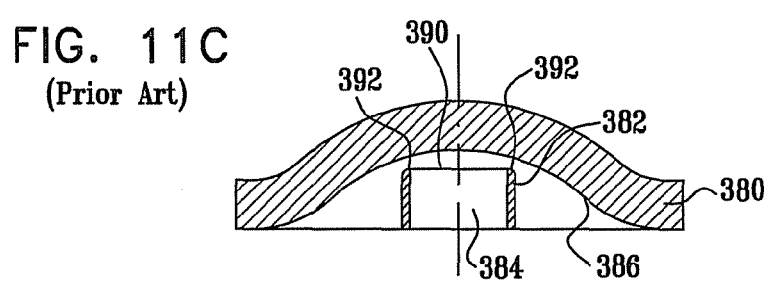
Figure 11D:
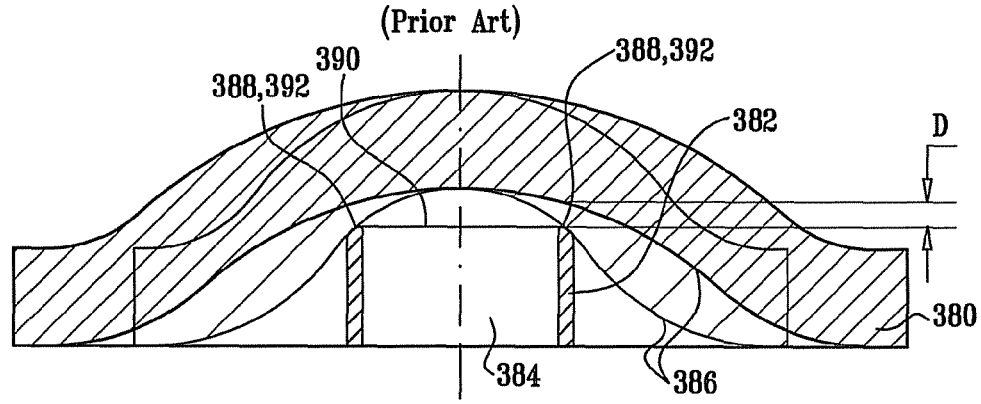

Reference is now made to FIGS. 11A, 11B, 11C and 11D, which are illustrations of a problem in the operation of prior art pressure-controlled anti-leakage drip irrigation emitters, FIG. 11A being a simplified not-to-scale pictorial illustration, FIGS. 11B and 11C being sectional illustrations taken along respective section lines XIB-XIB and XIC-XIC in FIG. 11A, and FIG. 11D being a superposition of portions of FIGS. 11B and 11C.

Reference is made to prior art pressure-controlled anti-leakage drip irrigation emitters which employ a non-square, rectangular elastic element 380 which is secured along its non-square, rectangular periphery and a circular raised wall 382 surrounding an inlet aperture 384. When the liquid pressure underlying the rectangular elastic element 380 is such that an underside surface 386 of the elastic element 380 barely touches portions 388 of the top surface 390 of wall 382, which lie closest to an edge of the elastic element 380, the underside surface 386 does not touch portions 392 of the top surface 390 which lie further from an edge of the elastic element 380. This can be seen with particular clarity in FIGS. 11B and 11C as well as in the superposition of FIGS. 11D.

The present inventors have understood that this constitutes a problem in pressure-controlled anti-leakage drip irrigation emitters, since there exists a range of pressures at which the inlet aperture is not fully open or fully closed by the elastic element 380, resulting in a leakage situation. Furthermore, the circumferentially incomplete contact between the elastic element 380 and top surface 390 of wall 382 surrounding the inlet aperture 384 inhibits sealing of the inlet aperture at even lower pressures, inasmuch as any contact between the elastic element 380 and any location on top surface 390 increases the amount of force required to establish further and full contact. Accordingly, the level of fluid pressure underlying the elastic element 380 required to achieve sealing of the inlet aperture is much lower than would otherwise be required to seal the inlet aperture, and undesired leakage occurs following termination of water supply to the drip irrigation line and following initial supply of water to the drip irrigation line.

Figure 12A:
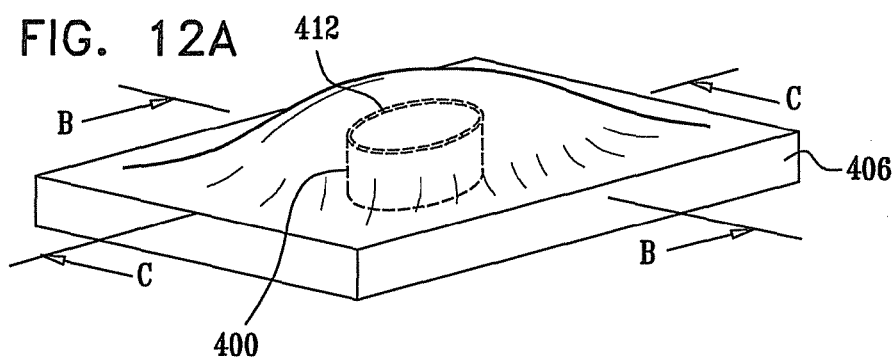
FIGS. 12A, 12B, 12C and 12D are simplified illustrations of a solution to the problem in the operation of prior art pressure-controlled anti-leakage drip irrigation emitters as shown in FIGS. 11A-11D, FIG. 12A being a simplified not-to-scale pictorial illustration, FIGS. 12B and 12C being sectional illustrations taken along respective section lines XIIB-XIIB and XIIC-XIIC in FIG. 12A, and FIG. 12D being a superposition of portions of FIGS. 12B and 12C.
Figure 12B:
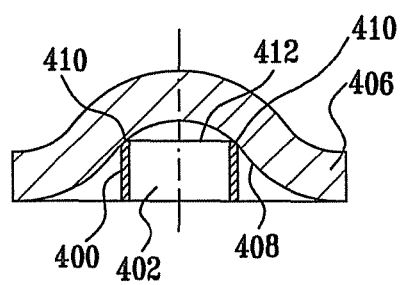
Figure 12C:
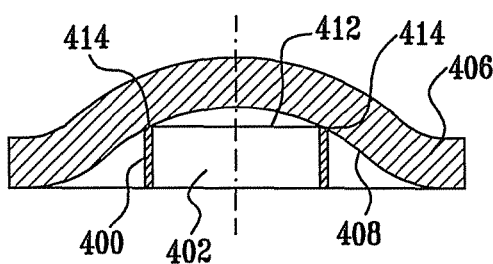
Figure 12D:
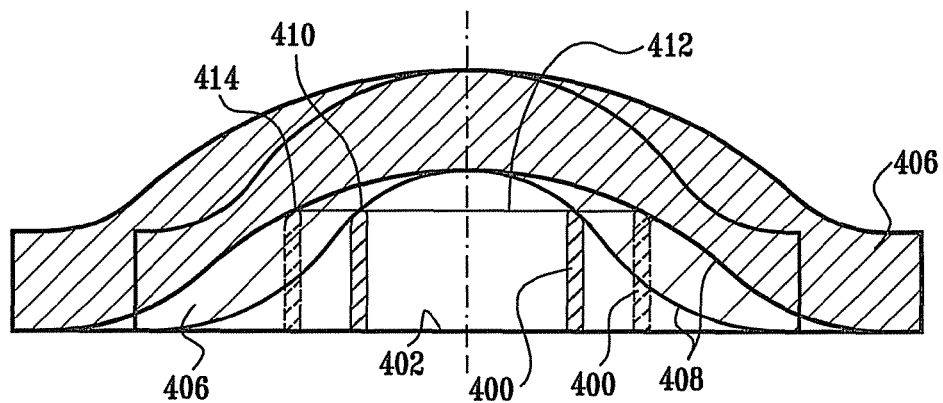

Reference is now made to FIGS. 12A, 12B, 12C and 12D, which are illustrations of a solution to the problem in the operation of prior art pressure-controlled anti-leakage drip irrigation emitters as shown in FIGS. 11A-11D and discussed hereinabove, FIG. 12A being a simplified not-to-scale pictorial illustration, FIGS. 12B and 12C being sectional illustrations taken along respective section lines XIIB-XIIB and XIIC-XIIC in FIG. 12A, and FIG. 12D being a superposition of portions of FIGS. 12B and 12C.

As seen in FIGS. 12A-12D, a non-circular raised wall 400 surrounds an inlet aperture 402. In this case, in accordance with a preferred embodiment of the present invention, when the liquid pressure underlying a rectangular elastic element 406 is such that an underside surface 408 of the elastic element 406 barely touches portions 410 of the top surface 412 of wall 400, which lie closest to an edge of the elastic element 406, the underside surface 408 simultaneously or nearly simultaneously also barely touches portions 414 of the top surface 412 which lie further from an edge of the elastic element. This can be seen with particular clarity in FIGS. 12B and 12C as well as in the superposition of FIG. 12D.

The present inventors have understood that this solves the problem in prior art pressure-controlled anti-leakage drip irrigation emitters which was discussed above with reference to FIGS. 11A-11D, by greatly reducing or eliminating the range of pressures at which the inlet aperture is not fully open or fully closed by the elastic element 380, resulting in a leakage situation. Furthermore, the circumferentially complete contact between the elastic element 406 and top surface 412 of wall 400 surrounding the inlet aperture 402 enhances sealing of the inlet aperture. Accordingly, the level of fluid pressure underlying the elastic element 406 required to achieve sealing of the inlet aperture can be higher than would otherwise be required to seal the inlet aperture in the prior art. Thus, sealing takes place following termination of water supply to the drip irrigation line at a higher line pressure and thus enables efficient use of the drip irrigation line over a greater range of variation of height than was possible in the prior art. Any leakage that occurs, takes place over a substantially shorter period following termination of water supply to the drip irrigation line, and over a shorter period following initial supply of water to the drip irrigation line, than in the prior art.

Figure 13A:
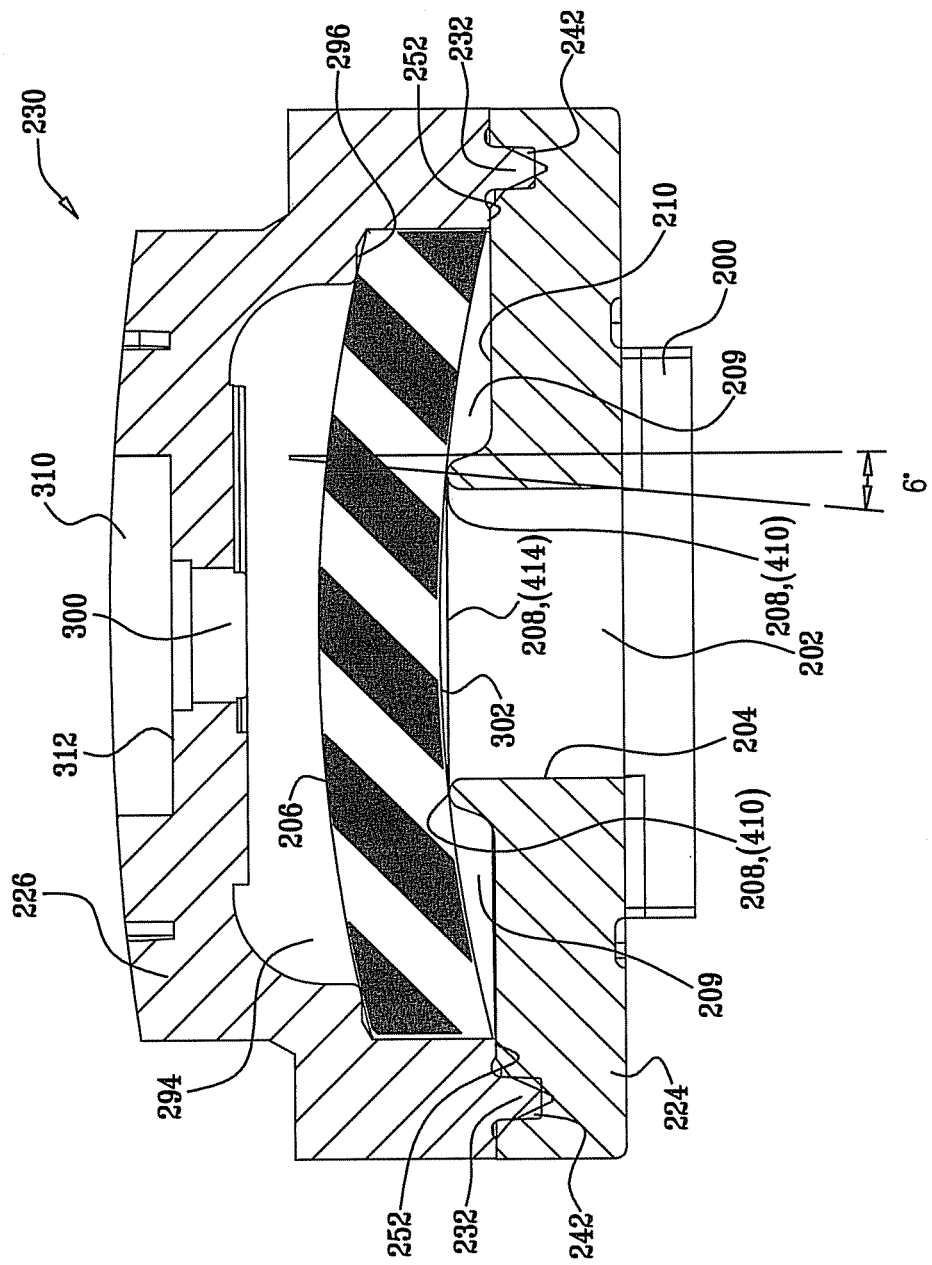
FIGS. 13A, 13B, 13C and 13D are generally to-scale simplified illustrations which correspond to FIGS. 12B and 12C in the context of the drip irrigation emitter element of FIGS. 2A-10, FIGS. 13A and 13B showing a first operative orientation of the drip irrigation emitter element and FIGS. 13C and 13D showing a second operative orientation of the drip irrigation emitter element.
Figure 13B:
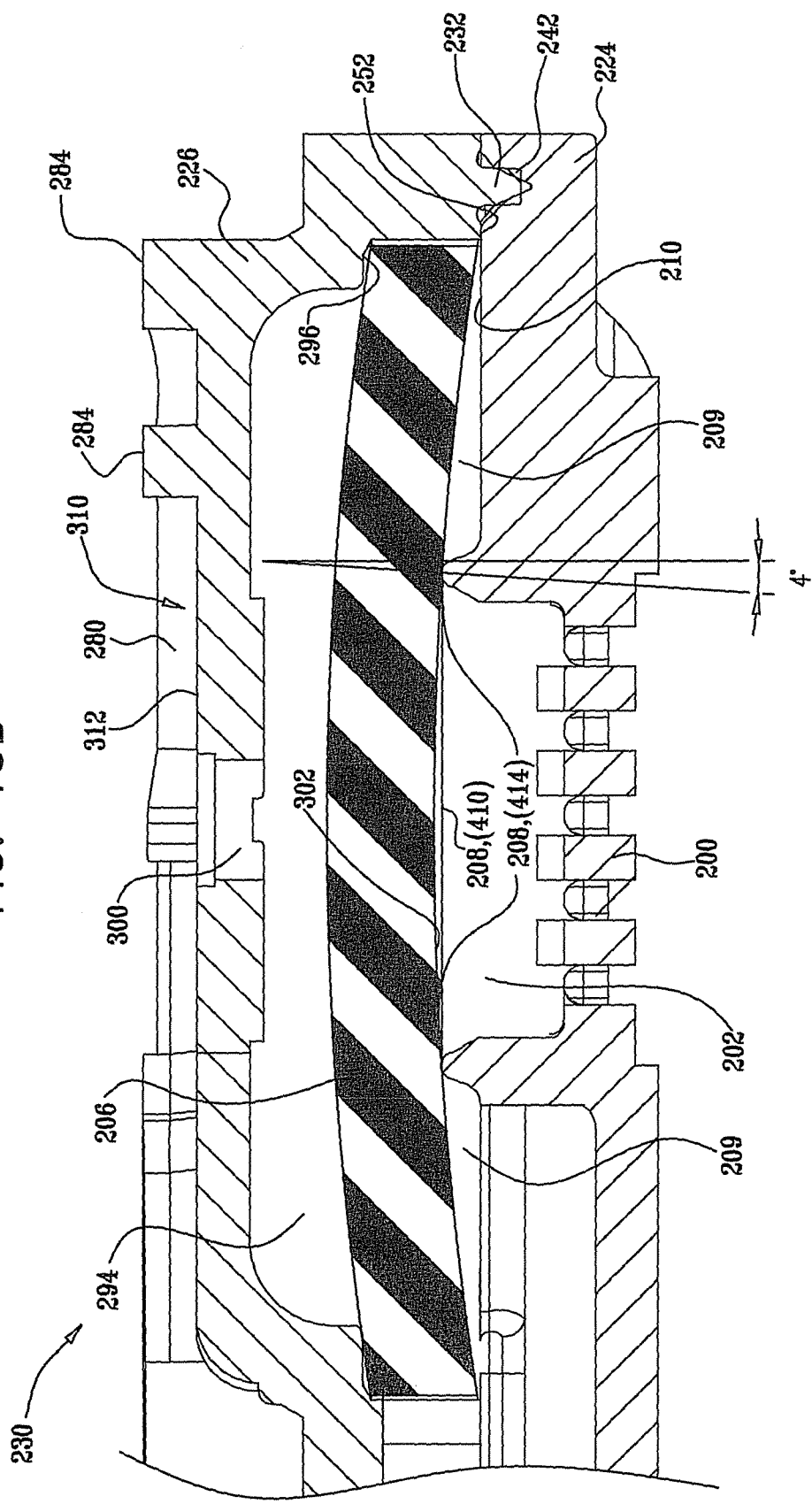
Figure 13C:
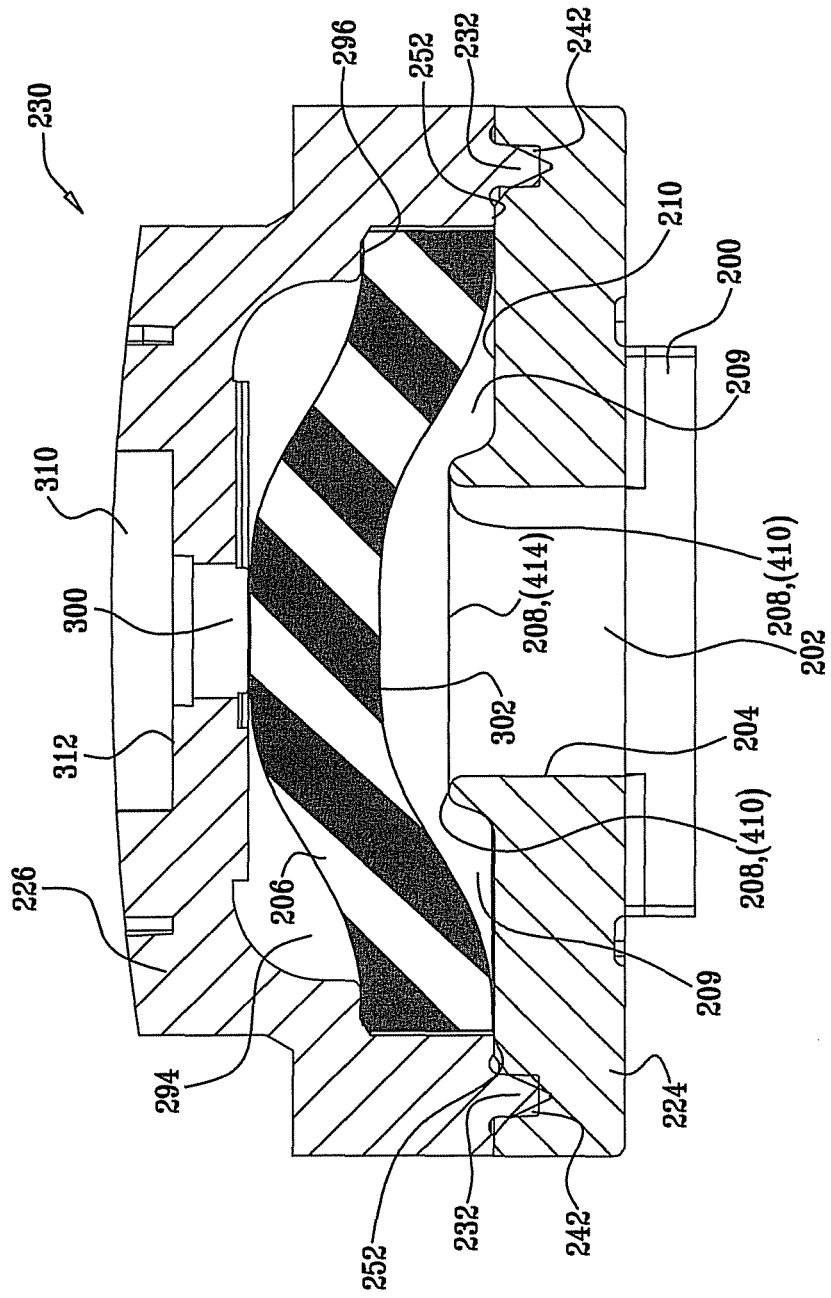
Figure 13D:
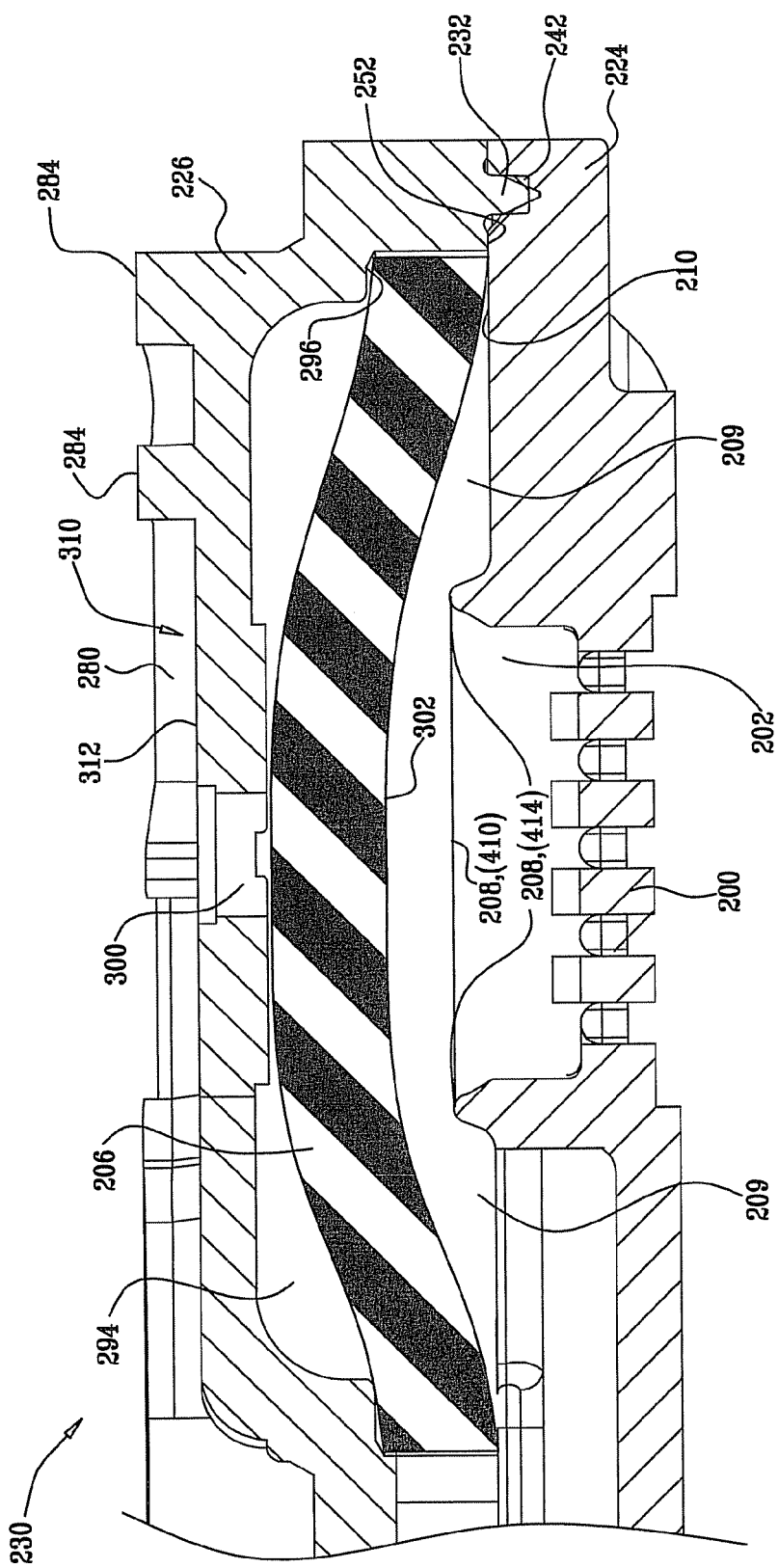

Reference is now made to FIGS. 13A, 13B, 13C and 13D, which are generally to-scale simplified illustrations which correspond to FIGS. 12B and 12C in the context of the drip irrigation emitter element of FIGS. 2A-10, FIGS. 13A and 13B showing a first operative orientation of the drip irrigation emitter element and FIGS. 13C and 13D showing a second operative orientation of the drip irrigation emitter element.

FIGS. 13A and 13B are generally to-scale simplified illustrations which correspond to FIGS. 12B and 12C in the context of the drip irrigation emitter element of FIGS. 2A-10. The non-circular configuration of the inlet aperture 402 (FIGS. 12A-12D) can be seen by considering the separations between portions of the rim 208 in respective FIGS. 13A (410 in FIG. 12B) and 13B (414 in FIG. 12C), which represent mutually perpendicular cross-sections of the drip irrigation emitter element. The indicated angles illustrate the angular engagement between the elastic element 206 and rim 208 of the wall 204 of the inlet aperture 202.

FIGS. 13A and 13B show the drip irrigation emitter element in a closed operative orientation in which surface 302 of elastic element 206 lies in sealed engagement with rim 208, thereby preventing the flow of water from inlet aperture 202 into inlet control chamber 209. FIGS. 13C and 13D show the drip irrigation emitter element in an open operative orientation in which surface 302 of elastic element 206 is displaced from sealed engagement with rim 208, thereby allowing the flow of water from inlet aperture 202 into inlet control chamber 209.

Transition of the drip irrigation emitter element from the closed operative orientation of FIGS. 13A and 13B to the open operative orientation of FIGS. 13C and 13D occurs when the water pressure in main water flow channel 100 (FIG. 1) exceeds a predetermined threshold preferably of 0.5 Atmospheres. Transition of the drip irrigation emitter element from the open operative orientation of FIGS. 13C and 13D to the closed operative orientation of FIGS. 13A and 13B occurs when the water pressure in main water flow channel 100 (FIG. 1) drops below a predetermined threshold preferably of 0.2 Atmospheres.

Figure 14A:
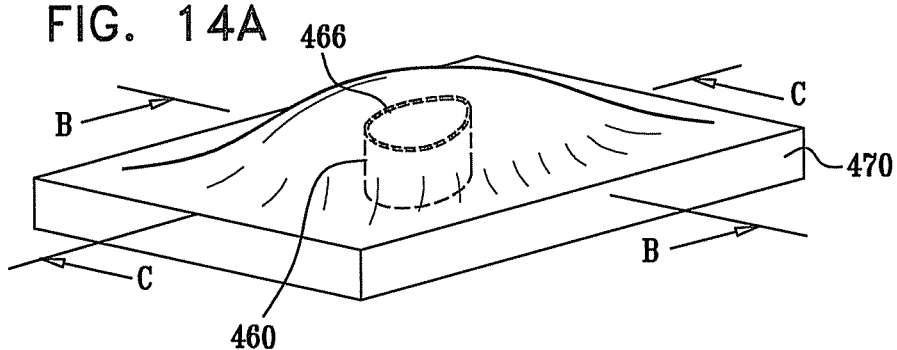
FIGS. 14A, 14B, 14C and 14D are simplified illustrations of another solution to the problem in the operation of prior art pressure-controlled anti-leakage drip irrigation emitters as shown in FIGS. 11A-11D, FIG. 14A being a simplified not-to-scale pictorial illustration, FIGS. 14B and 14C being sectional illustrations taken along respective section lines XIVB-XIVB and XIVC-XIVC in FIG. 14A, and FIG. 14D being a superposition of portions of FIGS. 14B and 14C.
Figure 14B:
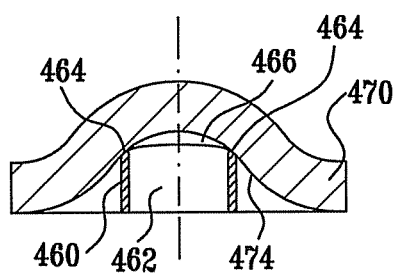
Figure 14C:
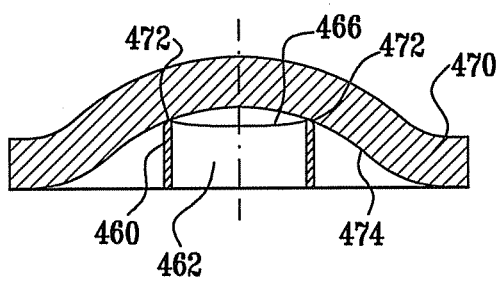
Figure 14D:
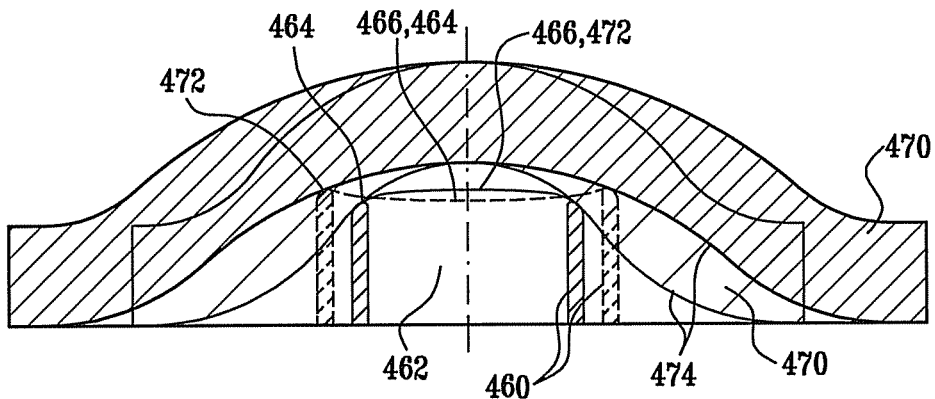

Reference is now made to FIGS. 14A, 14B, 14C and 14D, which are simplified illustrations of another solution to the problem in the operation of prior art pressure-controlled anti-leakage drip irrigation emitters as shown in FIGS. 11A-11D, FIG. 14A being a simplified not-to-scale pictorial illustration, FIGS. 14B and 14C being sectional illustrations taken along respective section lines XIVB-XIVB and XIVC-XIVC in FIG. 14A, and FIG. 14D being a superposition of portions of FIGS. 14B and 14C.

As seen in FIGS. 14A-14D, a non-circular raised wall 460 having a non-uniform wall height, surrounds an inlet aperture 462. It is appreciated that the inlet aperture 462 is typically of somewhat smaller dimensions than that of FIGS. 2A-10 and 12A-13B. The wall 460 is configured to be lowest at portions 464 of a top surface 466 of wall 460, which lie closest to an edge of an elastic element 470 and highest at portions 472 of the top surface 466 of wall 460, which lie furthest from an edge of the elastic element 470.

In this case, in accordance with another preferred embodiment of the present invention, when the liquid pressure underlying the rectangular elastic element 470 is such that an underside surface 474 of the elastic element 470 barely touches portions 464 of the top surface 466 of wall 460, the underside surface 474 simultaneously or nearly simultaneously also barely touches portions 472 of the top surface 466. This can be seen with particular clarity in FIGS. 14B and 14C as well as in the superposition of FIG. 14D.

The present inventors have understood that this embodiment also solves the problem in prior art pressure-controlled anti-leakage drip irrigation emitters which was discussed above with reference to FIGS. 11A-11D, by greatly reducing or eliminating the range of pressures at which the inlet aperture is not fully open or fully closed by the elastic element 380 (FIGS. 11A & 11B), resulting in a leakage situation. Furthermore, the circumferentially complete contact between the elastic element 470 and top surface 466 of wall 460 surrounding the inlet aperture 462 enhances sealing of the inlet aperture. Accordingly, the level of fluid pressure underlying the elastic element 470 required to achieve sealing of the inlet aperture can be higher than would otherwise be required to seal the inlet aperture in the prior art, and any leakage that occurs takes place over a substantially shorter period following termination of water supply to the drip irrigation line and over a shorter period following initial supply of water to the drip irrigation line than in the prior art. This enables efficient use of the drip irrigation line over a greater range of variation of height than was possible in the prior art.

Reference is now made to FIGS. 15A, 15B, 15C and 15D which are generally to-scale simplified illustrations which correspond to FIGS. 14B and 14C in the general context of the drip irrigation emitter element of FIGS. 2A-10, but having a somewhat smaller inlet aperture 202. The non-circular configuration of the inlet aperture 202 and its non-uniform wall height (FIGS. 14A-14D) can be seen by considering the separations between and variations in height of portions of the rim 208 in FIGS. 15A and 15C (464 in FIG. 14B) and in FIGS. 15B and 15D (472 in FIG. 14C), which represent mutually perpendicular cross-sections of the drip irrigation emitter element. The indicated angles in FIGS. 15A and 15B illustrate the angular engagement between the elastic element 206 and rim 208 of the wall 204 of the inlet aperture 202.

FIGS. 15A and 15B show the drip irrigation emitter element in a closed operative orientation in which surface 302 of elastic element 206 lies in sealed engagement with rim 208, thereby preventing the flow of water from inlet aperture 202 into inlet control chamber 209. FIGS. 15C and 15D show the drip irrigation emitter element in an open operative orientation in which surface 302 of elastic element 206 is displaced from sealed engagement with rim 208, thereby allowing the flow of water from inlet aperture 202 into inlet control chamber 209.

Transition of the drip irrigation emitter element from the closed operative orientation of FIGS. 15A and 15B to the open operative orientation of FIGS. 15C and 15D occurs when the water pressure in main water flow channel 100 (FIG. 1) exceeds a predetermined threshold of preferably 0.5 Atmospheres. Transition of the drip irrigation emitter element from the open operative orientation of FIGS. 15C and 15D to the closed operative orientation of FIGS. 15A and 15B occurs when the water pressure in main water flow channel 100 (FIG. 1) drops below a predetermined threshold of preferably 0.2 Atmospheres.

Reference is now made to FIGS. 16A, 16B, 16C and 16D, which are simplified sectional illustrations of drip irrigation apparatus constructed and operative in accordance with a preferred embodiment of the present invention, taken at locations indicated by respective arrows A, B, C and D in the general schematic illustration of FIG. 1.

FIGS. 16A-16D show drip irrigation apparatus of the general type shown in FIG. 1, and more particularly of the type shown in enlargements II and III in FIG. 1. FIGS. 16A-16D show drip irrigation apparatus of the type shown in enlargement II of FIG. 1, formed of an elongate sheet of plastic 500 to which drip irrigation emitter elements 502, preferably of the type described hereinabove with reference to FIGS. 2A-10, are welded.

One elongate edge of sheet 500, designated by reference numeral 504, is welded to an interior location of the sheet 500, which is designated by reference numeral 506, thereby to define a main water flow channel 508 which corresponds to main water flow channel 100 (FIG. 1).

An opposite elongate edge of sheet 500, designated by reference numeral 510 is welded at an exterior location of sheet 500, which is designated by reference numeral 512, to a secondary water flow channel labyrinth-defining strip 514, which is also welded to sheet 500, so as to define a secondary water flow channel 516, and a secondary water flow channel labyrinth 518.

Alternatively, strip 514 may have weeping hose functionality and/or sweat irrigation functionality, and in such a case, need not define a labyrinth.

FIG. 16A is a partially sectional, partially pictorial illustration, taken at arrows A-A in the general schematic illustration of FIG. 1 and along the section lines A-A in enlargement II of FIG. 1, which section lines pass through a water inlet 520 of the drip irrigation emitter element 502, which allows water to flow from main water flow channel 508.

FIG. 16B is a partially sectional, partially pictorial illustration, taken at arrows B-B in the general schematic illustration of FIG. 1 and along the section lines B-B in enlargement II of FIG. 1, which section lines pass through a water outlet 522 of the drip irrigation emitter element 502, which allows water to flow into the secondary water flow channel 516.

FIG. 16C is a partially sectional, partially pictorial illustration, taken at arrows C-C in the general schematic illustration of FIG. 1 and along the section lines C-C in enlargement II of FIG. 1, which section lines pass through a water inlet 524 of the secondary water flow channel labyrinth 518, which allows water to flow from the secondary water flow channel 516 into the secondary water flow channel labyrinth 518.

FIG. 16D is a partially sectional, partially pictorial illustration, taken at arrows D-D in the general schematic illustration of FIG. 1 and along the section lines D-D in enlargement II of FIG. 1, which section lines pass through a water outlet 526 of the secondary water flow channel labyrinth 518 which allows water to flow from the secondary water flow channel labyrinth 518 to the atmosphere.

Reference is now made to FIGS. 17A, 17B, 17C and 17D, which are simplified sectional illustrations of drip irrigation apparatus constructed and operative in accordance with another preferred embodiment of the present invention, taken at locations indicated by respective arrows A, B, C and D in the general schematic illustration of FIG. 1.

FIGS. 17A-17D show drip irrigation apparatus of the general type shown in FIG. 1, and more particularly of the type shown in enlargements II and III in FIG. 1. FIGS. 17A-17D show drip irrigation apparatus of the type shown in enlargement II of FIG. 1, formed of an elongate sheet of plastic 530 to which drip irrigation emitter elements 532, preferably of the type described hereinabove with reference to FIGS. 2A-10, are welded.

The elongate edges of sheet 530, designated by reference numerals 534 and 536, are welded together at a seam 538, thereby to define a main water flow channel 540 which corresponds to main water flow channel 100 (FIG. 1).

An elongate edge 542 of an additional elongate sheet of plastic 544 is welded at seam 538 to edge 534 of sheet 530. Alternatively, elongate sheet 544 may incorporate material having weeping hose functionality and/or sweat irrigation functionality. An opposite elongate edge 546 of sheet 544 is welded at an exterior location of sheet 530, which is designated by reference numeral 548, to a secondary water flow channel labyrinth-defining strip 550, which is also welded to sheet 530, so as to define a secondary water flow channel 552, and a secondary water flow channel labyrinth 554. Alternatively, strip 550 may have weeping hose functionality and/or sweat irrigation functionality, and in such a case, need not define a labyrinth.

Figure 17A:
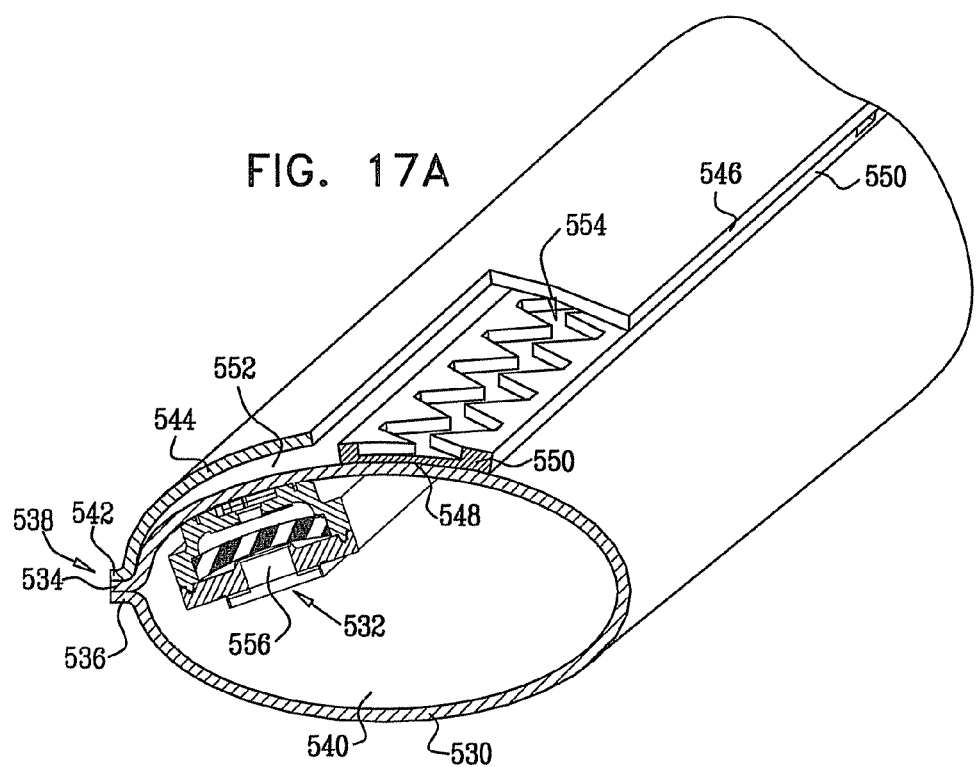

FIG. 17A is a partially sectional, partially pictorial illustration, taken at arrows A-A in the general schematic illustration of FIG. 1 and along the section lines A-A in enlargement II of FIG. 1, which section lines pass through a water inlet 556 of the drip irrigation emitter element 532, which allows water to flow from main water flow channel 540.

Figure 17B:
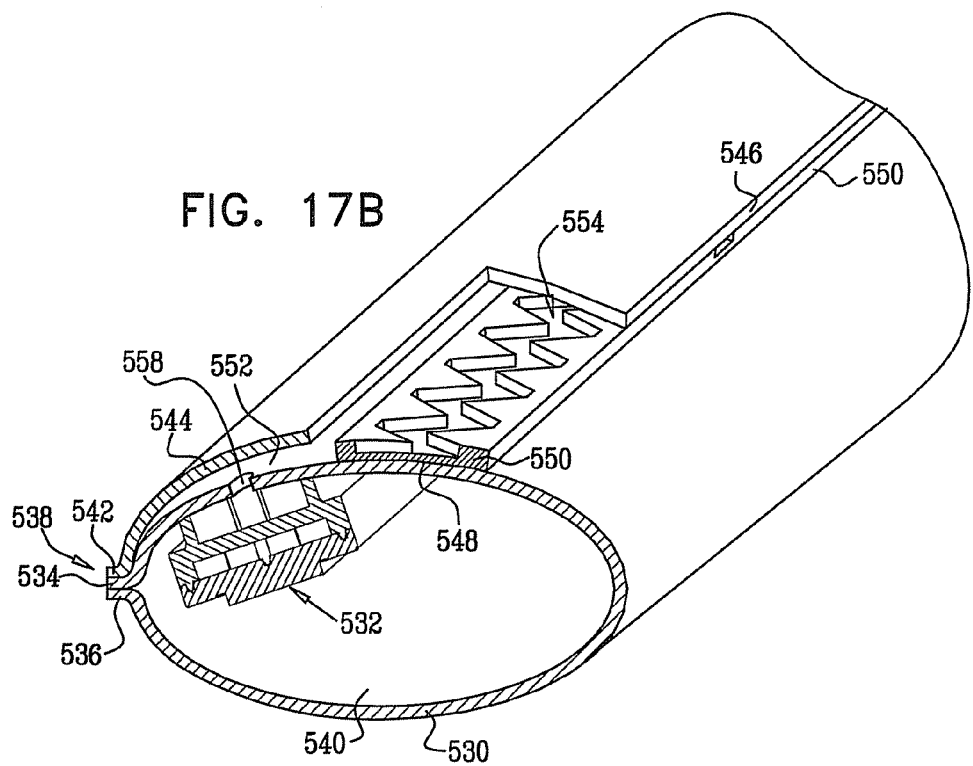

FIG. 17B is a partially sectional, partially pictorial illustration, taken at arrows B-B in the general schematic illustration of FIG. 1 and along the section lines B-B in enlargement II of FIG. 1, which section lines pass through a water outlet 558 of the drip irrigation emitter element 532, which allows water to flow into the secondary water flow channel 552.

Figure 17C:
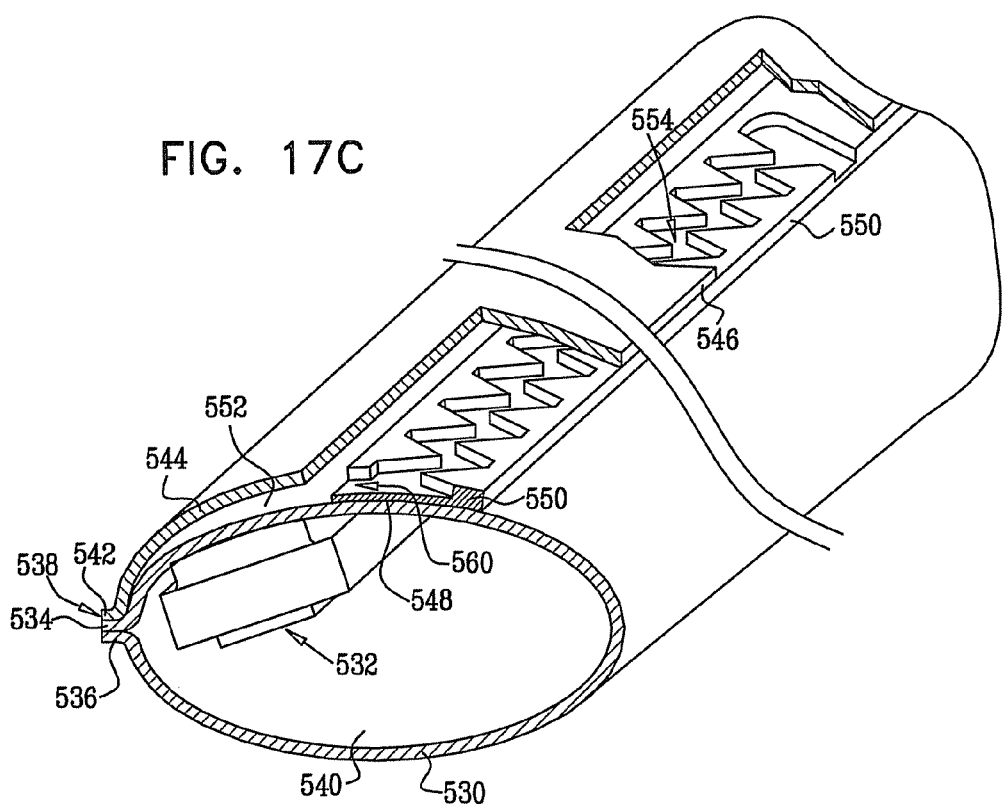

FIG. 17C is a partially sectional, partially pictorial illustration, taken at arrows C-C in the general schematic illustration of FIG. 1 and along the section lines C-C in enlargement II of FIG. 1, which section lines pass through a water inlet 560 of the secondary water flow channel labyrinth 554, which allows water to flow from the secondary water flow channel 552 into the secondary water flow channel labyrinth 554.

Figure 17D:
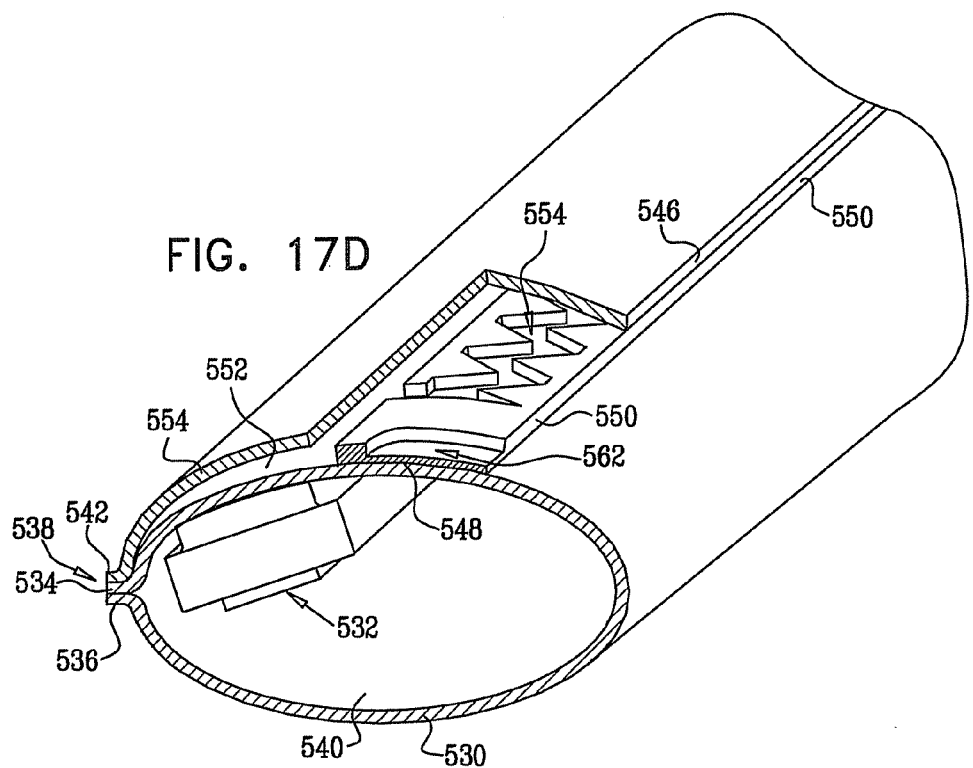

FIG. 17D is a partially sectional, partially pictorial illustration, taken at arrows D-D in the general schematic illustration of FIG. 1 and along the section lines D-D in enlargement II of FIG. 1, which section lines pass through a water outlet 562 of the secondary water flow channel labyrinth 554 which allows water to flow from the secondary water flow channel labyrinth 554 to the atmosphere.

Reference is now made to FIGS. 18A, 18B, 18C and 18D, which are simplified sectional illustrations of drip irrigation apparatus constructed and operative in accordance with yet another preferred embodiment of the present invention, taken at locations indicated by respective arrows A, B, C and D in the general schematic illustration of FIG. 1.

FIGS. 18A-18D show drip irrigation apparatus of the general type shown in FIG. 1, and more particularly of the type shown in enlargements II and III in FIG. 1. FIGS. 18A-18D show drip irrigation apparatus of the type shown in enlargement II of FIG. 1, formed of an elongate tube of plastic 570, to an interior wall of which are welded drip irrigation emitter elements 572, preferably of the type described hereinabove with reference to FIGS. 2A-10. The plastic tube 570 defines a main water flow channel 574 which corresponds to main water flow channel 100 (FIG. 1).

An elongate edge 576 of an elongate sheet of plastic 578 is welded to tube 570 at an exterior location therealong, designated by reference numeral 580. An opposite elongate edge 582 of sheet 578 is welded to a secondary water flow channel labyrinth-defining strip 584, which is welded to tube 570 at an exterior location therealong, designated by reference numeral 586, so as to define a secondary water flow channel 588, and a secondary water flow channel labyrinth 590.

Figure 18A:
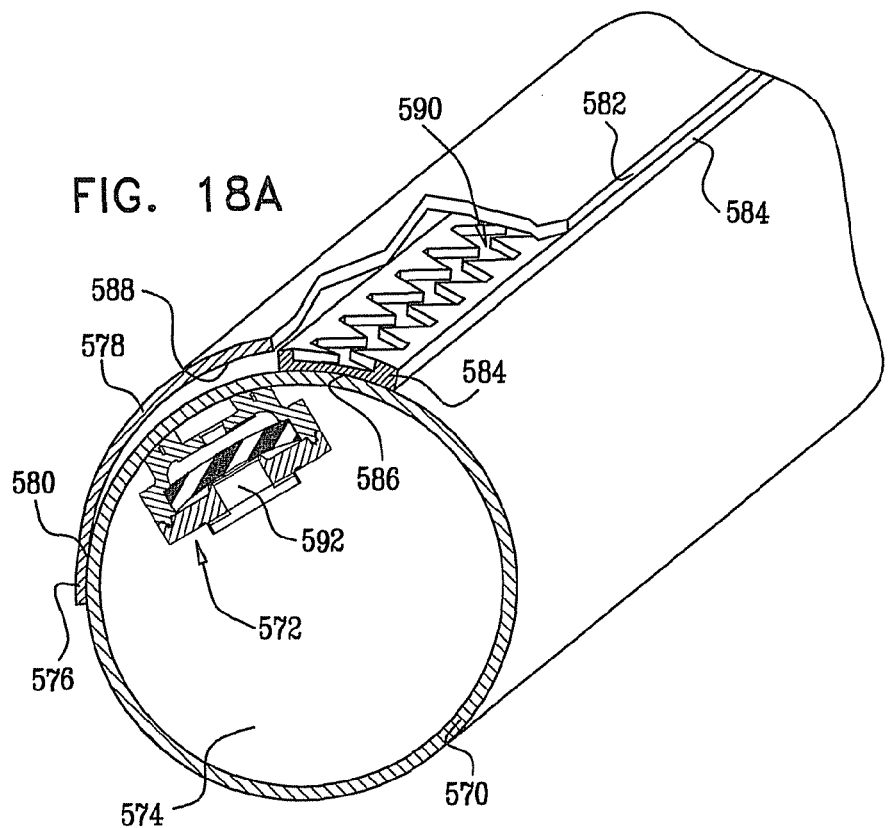

Elongate sheet 578 may alternatively incorporate material having weeping hose functionality and/or sweat irrigation functionality. Strip 584 may alternatively have weeping hose functionality and/or sweat irrigation functionality and in such a case, need not define a labyrinth. FIG. 18A is a partially sectional, partially pictorial illustration, taken at arrows A-A in the general schematic illustration of FIG. 1 and along the section lines A-A in enlargement II of FIG. 1, which section lines pass through a water inlet 592 of the drip irrigation emitter element 572, which allows water to flow from main water flow channel 574.

Figure 18B:
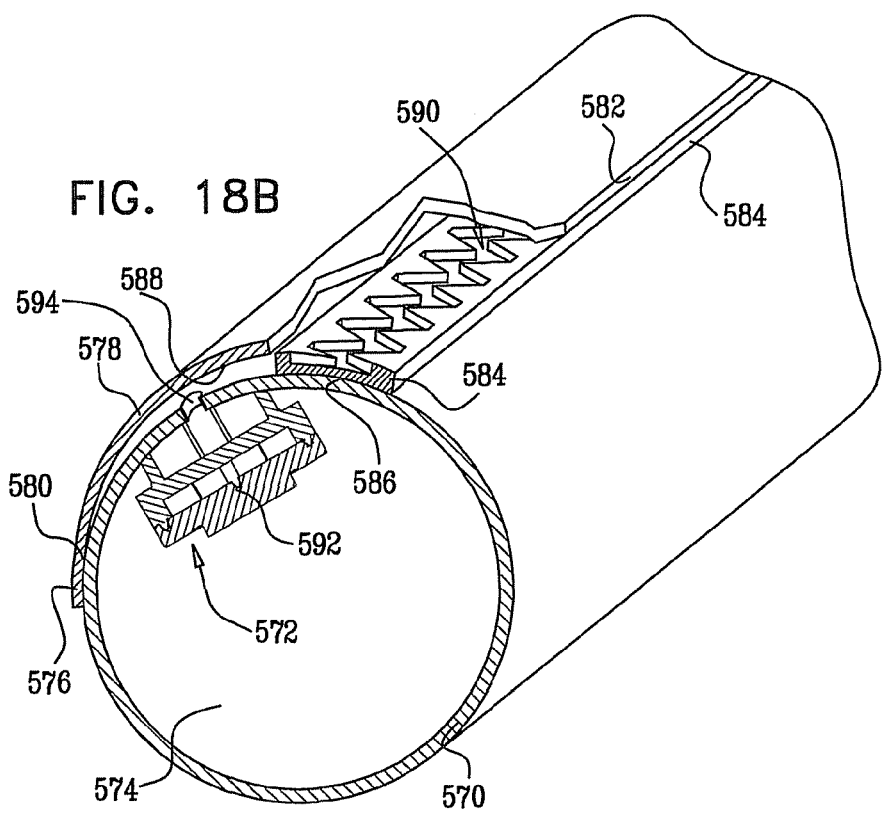

FIG. 18B is a partially sectional, partially pictorial illustration, taken at arrows B-B in the general schematic illustration of FIG. 1 and along the section lines B-B in enlargement II of FIG. 1, which section lines pass through a water outlet 594 of the drip irrigation emitter element 572, which allows water to flow into the secondary water flow channel 588.

Figure 18C:
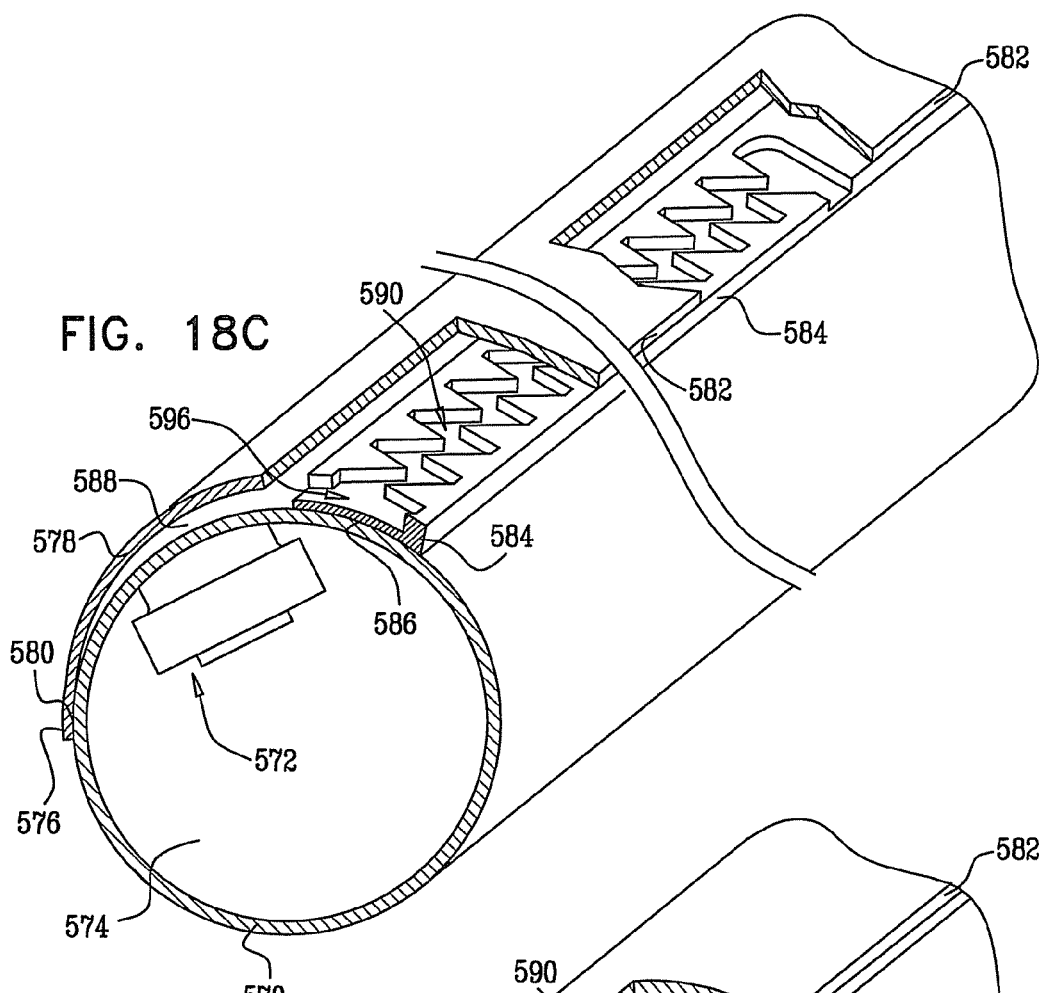

FIG. 18C is a partially sectional, partially pictorial illustration, taken at arrows C-C in the general schematic illustration of FIG. 1 and along the section lines C-C in enlargement II of FIG. 1, which section lines pass through a water inlet 596 of the secondary water flow channel labyrinth 590, which allows water to flow from the secondary water flow channel 588 to the secondary water flow channel labyrinth 590.

Figure 18D:
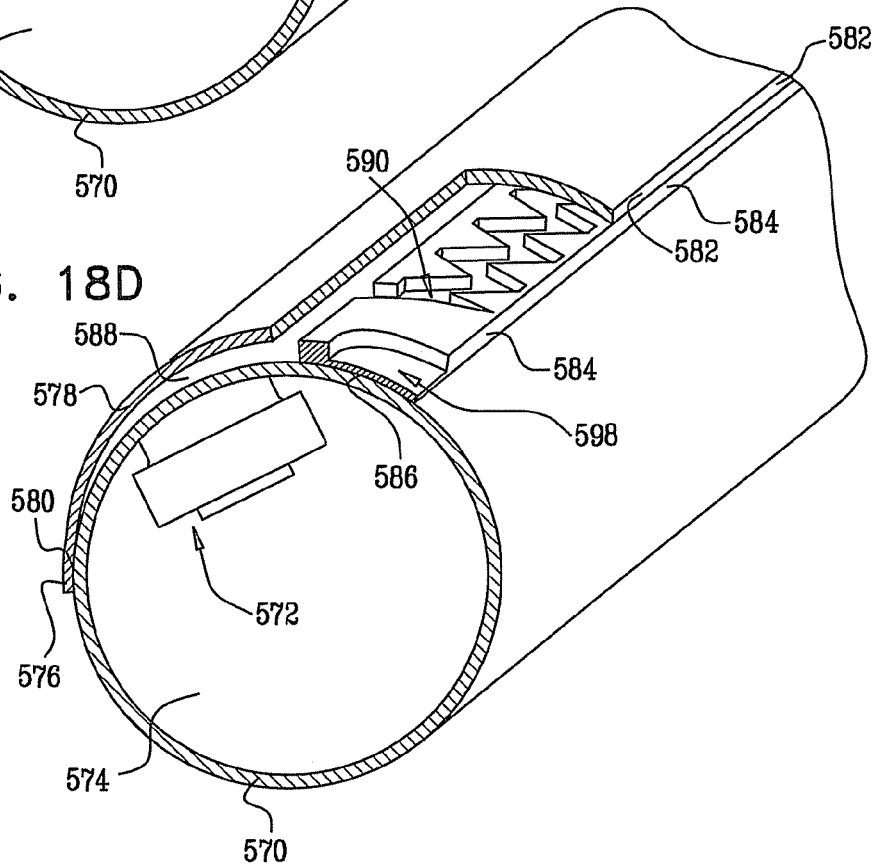

FIG. 18D is a partially sectional, partially pictorial illustration, taken at arrows D-D in the general schematic illustration of FIG. 1 and along the section lines D-D in enlargement II of FIG. 1, which section lines pass through a water outlet 598 of the secondary water flow channel labyrinth 590, which allows water to flow from the secondary water flow channel labyrinth 590 to the atmosphere.

Reference is now made to FIGS. 19A, 19B, 19C and 19D, which are simplified sectional illustrations of drip irrigation apparatus constructed and operative in accordance with still another preferred embodiment of the present invention, taken at locations indicated by respective arrows A, B, C and D in the general schematic illustration of FIG. 1.

FIGS. 19A-19D show drip irrigation apparatus of the general type shown in FIG. 1, and more particularly of the type shown in enlargements IV and V in FIG. 1. FIGS. 19A-19D show drip irrigation apparatus of the type shown in enlargement IV of FIG. 1, formed of an elongate tube of plastic 600, to an interior wall of which are welded drip irrigation emitter elements 602, preferably of the type described hereinabove with reference to FIGS. 2A-10. The plastic tube 600 defines a main water flow channel 604 which corresponds to main water flow channel 100 (FIG. 1).

An elongate edge 606 of an elongate sheet of plastic 608 is welded to tube 600 at an exterior location therealong, which is designated by reference numeral 610. An opposite elongate edge 612 of sheet 608 is welded to tube 600 at another exterior location therealong, designated by reference numeral 614, thereby defining a secondary water flow channel 616. Welded to an interior facing surface of sheet 608 is a secondary water flow channel labyrinth-defining element 618, which defines a secondary water flow channel labyrinth 620.

Elongate sheet 608 may alternatively incorporate material having weeping hose functionality and/or sweat irrigation functionality, and in such a case, element 618 may be omitted.

FIG. 19A is a partially sectional, partially pictorial illustration, taken at arrows A-A in the general schematic illustration of FIG. 1 and along the section lines A-A in enlargement IV of FIG. 1, which section lines pass through a water inlet 622 of the drip irrigation emitter element 602, which allows water to flow from main water flow channel 604.

FIG. 19B is a partially sectional, partially pictorial illustration, taken at arrows B-B in the corresponding schematic illustration of FIG. 1 and along the section lines B-B in enlargement IV of FIG. 1, which section lines pass through a water outlet 624 of the drip irrigation emitter element 602, which allows water to flow into the secondary water flow channel 616.

FIG. 19C is a partially sectional, partially pictorial illustration, taken at arrows C-C in the general schematic illustration of FIG. 1 and along the section lines C-C in enlargement IV of FIG. 1, which section lines pass through a water inlet 626 of the secondary water flow channel labyrinth 620, which allows water to flow from the secondary water flow channel 616 to the secondary water flow channel labyrinth 620.

FIG. 19D is a partially sectional, partially pictorial illustration, taken at arrows D-D in the general schematic illustration of FIG. 1 and along the section lines D-D in enlargement IV of FIG. 1, which section lines pass through a water outlet 628 of the secondary water flow channel labyrinth 620, which allows water to flow from the secondary water flow channel labyrinth 620 to the atmosphere.

Reference is now made to FIGS. 20A, 20B, 20C and 20D, which are simplified sectional illustrations of drip irrigation apparatus constructed and operative in accordance with a further preferred embodiment of the present invention, taken at locations indicated by respective arrows A, B, C and D in the general schematic illustration of FIG. 1.

FIGS. 20A-20D show drip irrigation apparatus of the general type shown in FIG. 1, and more particularly of the type shown in enlargements IV and V in FIG. 1. FIGS. 20A-20D show drip irrigation apparatus of the type shown in enlargement IV of FIG. 1, formed of an inner elongate tube of plastic 650, to an interior wall of which are welded drip irrigation emitter elements 652, preferably of the type described hereinabove with reference to FIGS. 2A-10. The plastic tube 650 defines a main water flow channel 654 which corresponds to main water flow channel 100 (FIG. 1).

An outer elongate plastic tube 656, which may be extruded over inner elongate tube 650, defines with an outer surface of inner elongate tube 650 a secondary water flow channel 658. Tube 656 may or may not be joined to tube 650.

Welded to an interior facing surface of tube 656 is a secondary water flow channel labyrinth-defining element 660, which defines a secondary water flow channel labyrinth 662. Tube 656 may alternatively incorporate material having weeping hose functionality and/or sweat irrigation functionality, and in such a case, element 660 may be omitted.

FIG. 20A is a partially sectional, partially pictorial illustration, taken at arrows A-A in the general schematic illustration of FIG. 1 and along the section lines A-A in enlargement IV of FIG. 1, which section lines pass through a water inlet 664 of the drip irrigation emitter element 652, which allows water to flow from main water flow channel 654.

FIG. 20B is a partially sectional, partially pictorial illustration, taken at arrows B-B in the general schematic illustration of FIG. 1 and along the section lines B-B in enlargement IV of FIG. 1, which section lines pass through a water outlet 666 of the drip irrigation emitter element 652, which allow water to flow into the secondary water flow channel 658.

Figure 20C:
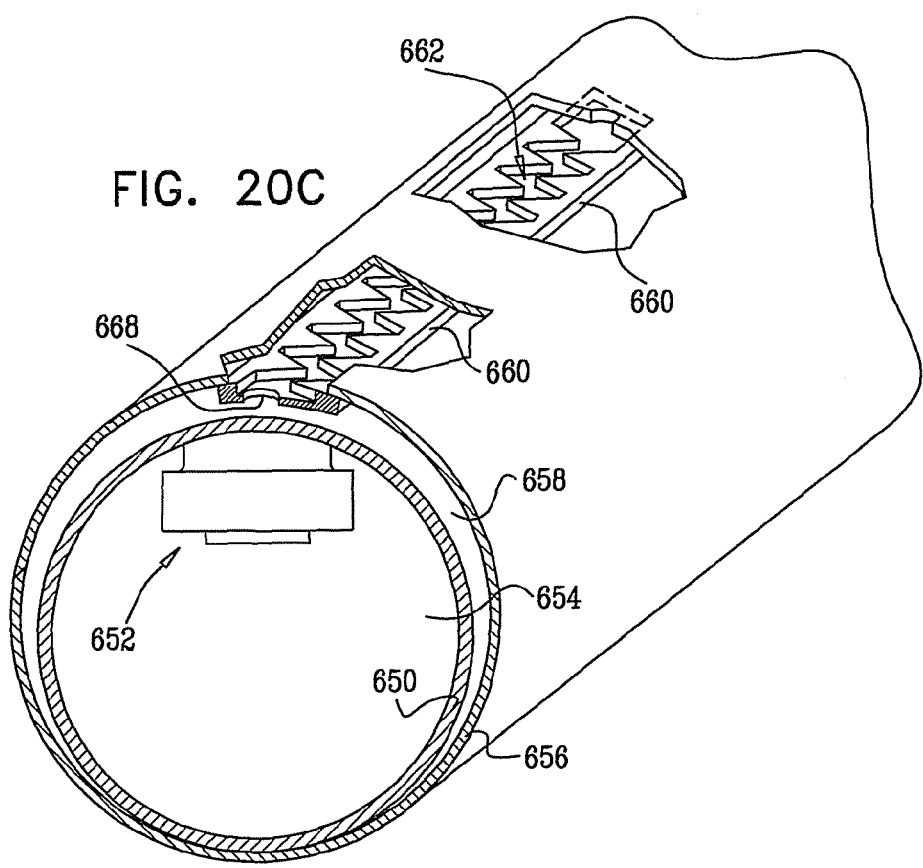

FIG. 20C is a partially sectional, partially pictorial illustration, taken at arrows C-C in the general schematic illustration of FIG. 1 and along the section lines C-C in enlargement IV of FIG. 1, which section lines pass through a water inlet 668 of the secondary water flow channel labyrinth 662, which allows water to flow from the secondary water flow channel 658 to the secondary water flow channel labyrinth 662.

Figure 20D:
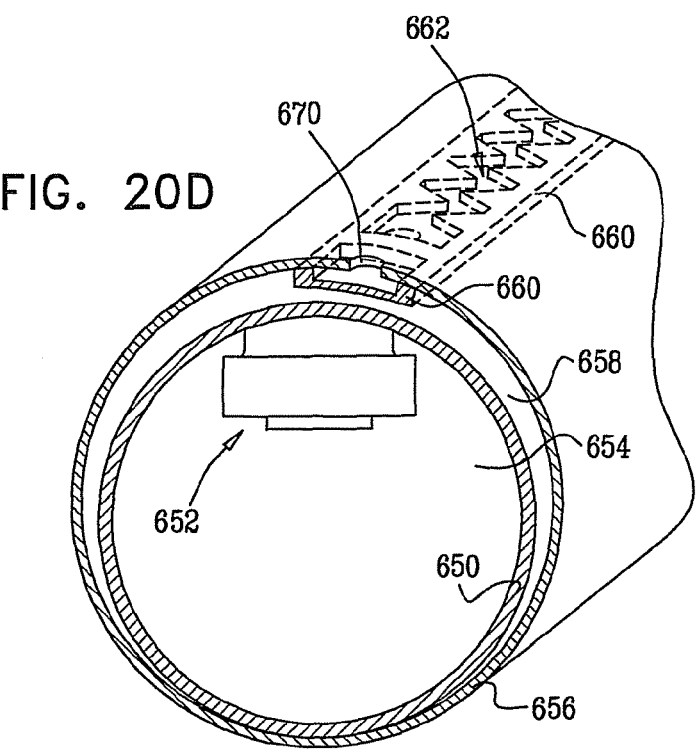

FIG. 20D is a partially sectional, partially pictorial illustration, taken at arrows D-D in the general schematic illustration of FIG. 1 and along the section lines D-D in enlargement IV of FIG. 1, which section lines pass through a water outlet 670 of the secondary water flow channel labyrinth 662, which allows water to flow from the secondary water flow channel labyrinth 662 to the atmosphere.

It is appreciated by persons skilled in the art that the present invention is not limited by what has been particularly shown and described hereinabove. Rather the scope of the present invention includes both combinations and subcombinations of various features described hereinabove as well as variations and modifications thereto which would occur to a person of skill in the art upon reading the above description and which are not in the prior art.

The invention claimed is:

1. Drip irrigation apparatus comprising:
   a main water flow channel having associated therewith along a length thereof a plurality of drip irrigation emitter units each including a labyrinthine pathway reducing the pressure of water passing therethrough and an elastic element governing the flow of water through said emitter as a function of line pressure applied to said elastic element; and
   at least one secondary water flow channel extending generally parallel to said main water flow channel and receiving water from at least one two of said drip irrigation emitter units, said at least one secondary water flow channel having water outlets disposed along the length of said main water flow channel, intermediate said irrigation emitter units.

2. Drip irrigation apparatus according to claim 1 and wherein said at least one secondary water flow channel comprises at least one of a weeping hose and a sweat irrigation hose.

3. Drip irrigation apparatus according to claim 1 and wherein said at least one secondary water flow channel has associated therewith at least one pressure reducing pathway, having outlets which correspond to said water outlets.

4. Drip irrigation apparatus according to claim 1 and wherein said main water flow channel is defined by welding of one elongate edge of a sheet to an interior location therealong.

5. Drip irrigation apparatus according to claim 4 and wherein said at least one secondary water flow channel is defined by welding of another elongate edge of said sheet to a labyrinth defining strip which is welded to said sheet at an exterior location therealong.

6. Drip irrigation apparatus according to claim 4 and wherein said main water flow channel has welded at an interior location therealong at least one of said plurality of pressure controlled drip irrigation emitter units.

7. Drip irrigation apparatus according to claim 4 and wherein said at least one secondary water flow channel includes material having at least one of weeping hose functionality and sweat irrigation functionality.

8. Drip irrigation apparatus according to claim 1 and wherein said main water flow channel is defined by welding of first and second elongate edges of a first sheet at a seam location.

9. Drip irrigation apparatus according to claim 8 and wherein said at least one secondary water flow channel is defined by welding of a first elongate edge of a second sheet to said first elongate edge of said first sheet at said seam location and by welding a second elongate edge of said second sheet to a labyrinth defining strip which is welded to said first sheet at an exterior location therealong.

10. Drip irrigation apparatus according to claim 1 and wherein said main water flow channel is defined by an elongate tube.

11. Drip irrigation apparatus according to claim 10 and wherein said at least one secondary water flow channel is defined by welding of a first elongate edge of a sheet to said elongate tube at a first exterior location therealong and by welding of a second elongate edge of said sheet to a labyrinth defining strip which is welded to said elongate tube at a second exterior location therealong.

12. Drip irrigation apparatus according to claim 10 and wherein said at least one secondary water flow channel is defined by welding of a first elongate edge of a sheet to said elongate tube at a first exterior location therealong and by welding of a second elongate edge of said sheet to said elongate tube at a second exterior location therealong, said sheet having a labyrinth defining strip welded at a surface thereof which faces an exterior surface of said elongate tube.

13. Drip irrigation apparatus according to claim 10 and wherein said at least one secondary flow channel is defined by a second elongate tube surrounding said elongate tube, said second elongate tube having welded at a first location of an interior surface thereof a labyrinth defining strip and being welded at a second location of said interior surface thereof to an outer surface of said elongate tube.

14. Drip irrigation apparatus comprising:
   a main water flow channel having associated therewith along a length thereof a plurality of drip irrigation emitter units each including a labyrinthine pathway reducing the pressure of water passing therethrough and an elastic element governing the flow of water through said emitter as a function of line pressure applied to said elastic element;

at least one secondary water flow channel extending generally parallel to said main water flow channel and receiving water from at least two of said plurality of drip irrigation emitter units; and at least one pressure-reducing pathway associated with each of said at least one secondary water flow channel and distributed therealong, said at least one pressure-reducing pathway having outlets disposed along the length of said main water flow channel, intermediate said plurality of drip irrigation emitter units.

15. Drip irrigation apparatus according to claim 14 and wherein said outlets are defined by welding.

16. Drip irrigation apparatus according to claim 14 and wherein said at least one pressure reducing pathway comprises a series of discrete labyrinths each having an inlet and an outlet.

17. Drip irrigation apparatus according to claim 16 and wherein said discrete labyrinths are realized by embossing of said at least one secondary water flow channel.

18. Drip irrigation apparatus according to claim 16 and wherein said discrete labyrinths are realized by attaching discrete labyrinth elements to said at least one secondary water flow channel.

19. Drip irrigation apparatus according to claim 14 and wherein said at least one pressure reducing pathway comprises a generally continuous series of non-mutually communicating labyrinths, each having an inlet and an outlet.

20. Drip irrigation apparatus according to claim 19 and wherein said non-mutually communicating labyrinths are realized by embossing of said at least one secondary water flow channel.

21. Drip irrigation apparatus according to claim 19 and wherein said inlet faces said at least one secondary water flow channel and said outlet faces away from said at least one secondary water flow channel.

22. Drip irrigation apparatus according to claim 14 and wherein said at least one pressure reducing pathway comprises a generally continuous labyrinth, having multiple inlets and multiple outlets.

23. Drip irrigation apparatus according to claim 22 and wherein said multiple outlets are generally evenly spaced on either side of each of said multiple inlets.

24. Drip irrigation apparatus according to claim 22 and wherein two of said multiple outlets are provided for each of said multiple inlets.

25. Drip irrigation apparatus according to claim 22 and wherein said multiple inlets face said at least one secondary water flow channel and said multiple outlets face away from said at least one secondary water flow channel.

26. Drip irrigation apparatus according to claim 14 and wherein at least one of said plurality of drip irrigation emitter units comprises:

an inlet aperture; and a raised wall having a rim, said raised wall and said rim surrounding said inlet aperture; and wherein said elastic element is operative to be displaced when water pressure in said main water flow channel exceeds a predetermined threshold, and to be in sealed engagement with said rim of said raised wall when water pressure in said main water flow channel does not exceed said predetermined threshold.

27. Drip irrigation apparatus according to claim 26 and wherein said raised wall comprises a non-circular wall, and said rim is configured such that at a predetermined threshold pressure across said elastic element, said elastic element transitions from generally complete circumferential disengagement with said rim to generally complete circumferential engagement with said rim.

28. Drip irrigation apparatus according to claim 27 and wherein said rim is configured such that at a second predetermined threshold pressure across said elastic element, said elastic element transitions from generally complete circumferential engagement with said rim to generally complete circumferential disengagement with said rim.

29. Drip irrigation apparatus according to claim 27 and wherein said rim of said non-circular wall is non-planar.

30. Drip irrigation apparatus according to claim 14 and wherein at least one of said plurality of drip irrigation emitter units comprises two mutually sealed portions.

31. Drip irrigation apparatus according to claim 30 and wherein:

a first one of said two mutually sealed portions comprises:

a circumferential raised elongate portion; and an internal raised elongate portion extending between two sections of said at least one pressure-reducing pathway; and a second one of said two mutually sealed portions comprises:

a circumferential elongate recess; and an internal elongate recess, said two mutually sealed portions being sealed by engagement of said raised elongate portions with said elongate recesses.

32. Drip irrigation apparatus according to claim 31 and wherein said raised elongate portions have a generally triangular cross section, and said elongate recesses have a generally rectangular cross section.

33. Drip irrigation apparatus according to claim 31 and wherein said two mutually sealed portions are sealed ultrasonically.

34. Drip irrigation apparatus according to claim 33 and wherein said two mutually sealed portions are sealed ultrasonically along said raised elongate portions and said elongate recesses.

35. Drip irrigation apparatus according to claim 34 and wherein at least one of said two mutually sealed portions and said at least one pressure reducing pathway is not deformed by ultrasonic sealing of said raised elongate portions and said elongate recesses.

36. Drip irrigation apparatus according to claim 34 and wherein dimensions of at least one of said two mutually sealed portions and said at least one pressure reducing pathway are not changed by ultrasonic sealing of said raised elongate portions and said elongate recesses.

37. Drip irrigation apparatus according to claim 31 and wherein said first one of said two mutually sealed portions includes a circumferential raised wall and an internal raised wall having a protrusion therebetween, said protrusion being operative to at least partially prevent particular matter from flowing into said at least one pressure reducing pathway.

* * * * *